US012328519B2

(12) United States Patent
Wuen et al.

(10) Patent No.: US 12,328,519 B2
(45) Date of Patent: Jun. 10, 2025

(54) IMAGE SENSOR

(71) Applicant: Novatek Microelectronics Corp., Hsinchu (TW)

(72) Inventors: Wen-Shen Wuen, Hsinchu County (TW); Shen-Fu Tsai, Taoyuan (TW); Cho-Hsuan Jhang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 574 days.

(21) Appl. No.: 17/671,609

(22) Filed: Feb. 15, 2022

(65) Prior Publication Data

US 2023/0262351 A1    Aug. 17, 2023

(51) Int. Cl.
*H04N 25/771* (2023.01)
*H04N 25/50* (2023.01)
*H04N 25/78* (2023.01)
*H04N 25/79* (2023.01)
*H04N 25/707* (2023.01)

(52) U.S. Cl.
CPC ........... *H04N 25/771* (2023.01); *H04N 25/50* (2023.01); *H04N 25/78* (2023.01); *H04N 25/79* (2023.01); *H04N 25/707* (2023.01)

(58) Field of Classification Search
CPC .................................................. H04N 25/771
See application file for complete search history.

(56) References Cited

U.S. PATENT DOCUMENTS

| 10,104,318 | B2 | 10/2018 | Smith et al. | |
| 10,798,322 | B2 | 10/2020 | Smith et al. | |
| 10,845,308 | B2 | 11/2020 | Rothberg et al. | |
| 11,112,361 | B2 | 9/2021 | Rothberg et al. | |
| 11,719,635 | B2 | 8/2023 | Rothberg et al. | |
| 2002/0024605 | A1* | 2/2002 | Merrill | H04N 25/587 348/E3.018 |
| 2007/0114629 | A1 | 5/2007 | Dosluoglu et al. | |
| 2009/0059047 | A1* | 3/2009 | Murata | H04N 25/59 348/297 |
| 2010/0252717 | A1* | 10/2010 | Dupont | H03F 3/08 250/214 A |
| 2010/0309352 | A1* | 12/2010 | Mashiyama | H04N 25/57 348/294 |
| 2013/0277561 | A1* | 10/2013 | Woolaway | H04N 25/617 250/340 |

(Continued)

FOREIGN PATENT DOCUMENTS

| CN | 105794203 | 7/2016 |
| CN | 109410130 | 3/2019 |
| CN | 110168732 | 8/2019 |

*Primary Examiner* — David N Werner
(74) *Attorney, Agent, or Firm* — JCIPRNET

(57) ABSTRACT

An image sensor, including a photosensitive pixel array, a storage element, and a displacement processing element, is provided. The photosensitive pixel array includes a photosensitive pixel. The storage element is configured to store a first sensing result of the photosensitive pixel at a first time point. The displacement processing element is coupled to the storage element to receive the first sensing result. The displacement processing element is configured to generate displacement information, wherein an image frame with the displacement information is transmitted to the outside of the image sensor.

24 Claims, 29 Drawing Sheets

(56) References Cited

U.S. PATENT DOCUMENTS

| | | | |
|---|---|---|---|
| 2016/0100114 A1* | 4/2016 | Bergey | H04N 25/616 |
| | | | 348/250 |
| 2016/0323524 A1 | 11/2016 | Smith et al. | |
| 2017/0118430 A1* | 4/2017 | Koifman | H04N 25/78 |
| 2017/0264838 A1* | 9/2017 | Maes | H04N 25/58 |
| 2018/0077370 A1* | 3/2018 | Nishino | H04N 25/672 |
| 2018/0180546 A1 | 6/2018 | Rothberg et al. | |
| 2018/0184020 A1* | 6/2018 | Vampola | H04N 25/533 |
| 2018/0240837 A1* | 8/2018 | Chen | H04N 25/77 |
| 2019/0082125 A1 | 3/2019 | Smith et al. | |
| 2019/0149754 A1* | 5/2019 | Otaka | H04N 25/772 |
| | | | 348/296 |
| 2020/0029049 A1* | 1/2020 | Okura | H04N 25/78 |
| 2020/0204751 A1* | 6/2020 | Lule | H04N 25/771 |
| 2020/0267337 A1* | 8/2020 | Wei | H03K 19/20 |
| 2020/0312896 A1* | 10/2020 | Simony | H04N 25/771 |
| 2020/0382762 A1* | 12/2020 | Meynants | H04N 25/707 |
| 2021/0006739 A1* | 1/2021 | Wu | H04N 25/77 |
| 2021/0025824 A1 | 1/2021 | Rothberg et al. | |
| 2021/0144330 A1* | 5/2021 | Otaka | H04N 25/78 |
| 2022/0018776 A1 | 1/2022 | Rothberg et al. | |
| 2022/0070395 A1* | 3/2022 | Tang | H04N 25/616 |
| 2022/0070399 A1* | 3/2022 | Tang | H04N 25/77 |
| 2023/0007204 A1* | 1/2023 | Xu | H04N 25/771 |

* cited by examiner

IMAGE SENSOR

BACKGROUND

Technical Field

The disclosure relates to an integrated circuit, and particularly relates to an image sensor.

Description of Related Art

The image sensor can sense a scene to generate an image frame for the image processor. The image sensor must go through a frame period (containing an exposure period and a reading period) to provide a complete image frame to the next stage integrated circuit (for example, the image processor). The image processor obtains different image frames from the image sensor at different times and uses different image frames to perform motion detection operations to generate displacement information. The term "motion" refers to the motion of a moving object in the scene or the relative motion between the scene and the image sensor. The image processor must go through multiple frame periods to generate a motion frame (the displacement-information). In addition, the data transmission bandwidth between the image sensor and the image processor is limited. The image sensor must transmit multiple image frames to the image processor for the motion detection operations. In order to transmit a large number of image frames, a conventional circuit needs to pay a cost to increase the data transmission bandwidth between the image sensor and the image processor.

SUMMARY

The disclosure provides an image sensor to generate an image frame with displacement information.

In an embodiment of the disclosure, the image sensor includes a photosensitive pixel array, a first storage element, and a displacement processing element. The photosensitive pixel array includes a photosensitive pixel. The first storage element is configured to store a first sensing result of the photosensitive pixel at a first time point. The displacement processing element is coupled to the first storage element to receive the first sensing result. The displacement processing element is configured to generate displacement information. An image frame with the displacement information is transmitted to an outside of the image sensor.

In an embodiment of the disclosure, the image sensor includes a photosensitive pixel array and a displacement processing element. The photosensitive pixel array includes at least one photosensitive pixel. The displacement processing element is configured to receive at least two sensing results from the photosensitive pixel array, and generate displacement information, wherein the displacement information includes at least one of displacement magnitude, direction, speed and acceleration. An image frame with the displacement information is transmitted to an outside of the image sensor.

Based on the above, the image sensor (an integrated circuit) of the embodiments of the disclosure is configured with the photosensitive pixel array, the first storage element, and the displacement processing element. The first storage element may store the first sensing result of the photosensitive pixel at the first time point. Based on the second sensing result of the photosensitive pixel at the second time point and/or based on the first sensing result provided by the first storage element, the displacement processing element may generate the image frame with the displacement information to an external circuit (for example, an image processor) of the image sensor. In some operation examples, the first time point and the second time point may be different time points in the same frame period, so the image sensor may transmit the displacement information to the external circuit (for example, the image processor) in each frame period.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
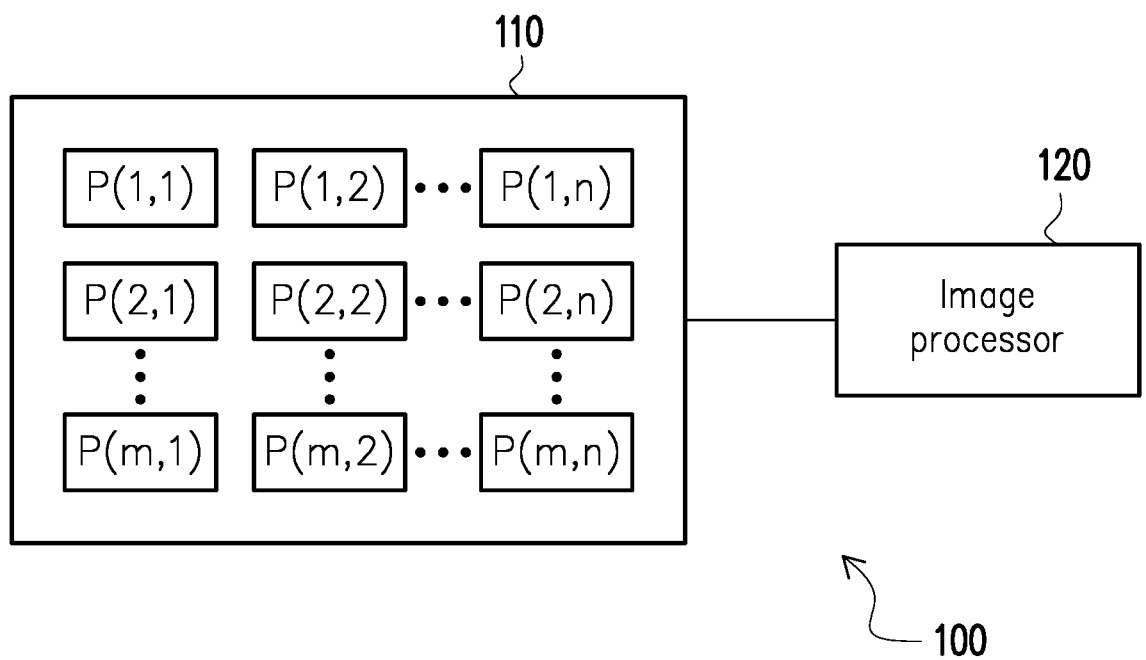
FIG. 1 is a schematic diagram of a circuit block of an image sensing device according to an embodiment of the disclosure.

The term "coupling (or connection)" used in the full text of the specification (including the claims) of the disclosure may refer to any direct or indirect connection means. For example, if it is described in the text that a first device is coupled (or connected) to a second device, it should be interpreted as that the first device may be directly connected to the second device or the first device may be indirectly connected to the second device through other devices or a certain connection means. Terms such as "first" and "second" mentioned in the full text of the specification (including the claims) of the disclosure are used to name elements or to distinguish different embodiments or ranges, and are not used to limit an upper limit or a lower limit of the number of the elements or to limit the sequence of the elements. In addition, wherever possible, elements/components/steps using the same reference numerals in the drawings and embodiments represent the same or similar parts. Descriptions of the elements/components/steps using the same reference numerals or using the same terms in different embodiments may be cross-referenced.

FIG. 1 is a schematic diagram of a circuit block of an image sensor device 100 according to an embodiment of the disclosure. The image sensor device 100 shown in FIG. 1 includes an image sensor 110 and an image processor 120. The image sensor 110 and the image processor 120 are different integrated circuits. The image sensor 110 includes a photosensitive pixel array, such as photosensitive pixels P(1,1), P(1,2), ..., P(1,n), P(2,1), P(2,2), ..., P(2,n), ... , P(m,1), P(m,2), ..., P(m,n) shown in FIG. 1. The photosensitive pixels P(1,1) to P(m,n) may sense the illuminance of a scene. In some operation examples, the image sensor 110 may transmit an image frame with displacement information to an external circuit (for example, the image processor 120) in each frame period. Therefore, the image processor 120 may obtain the displacement information without a motion detection operation.

Figure 2A:
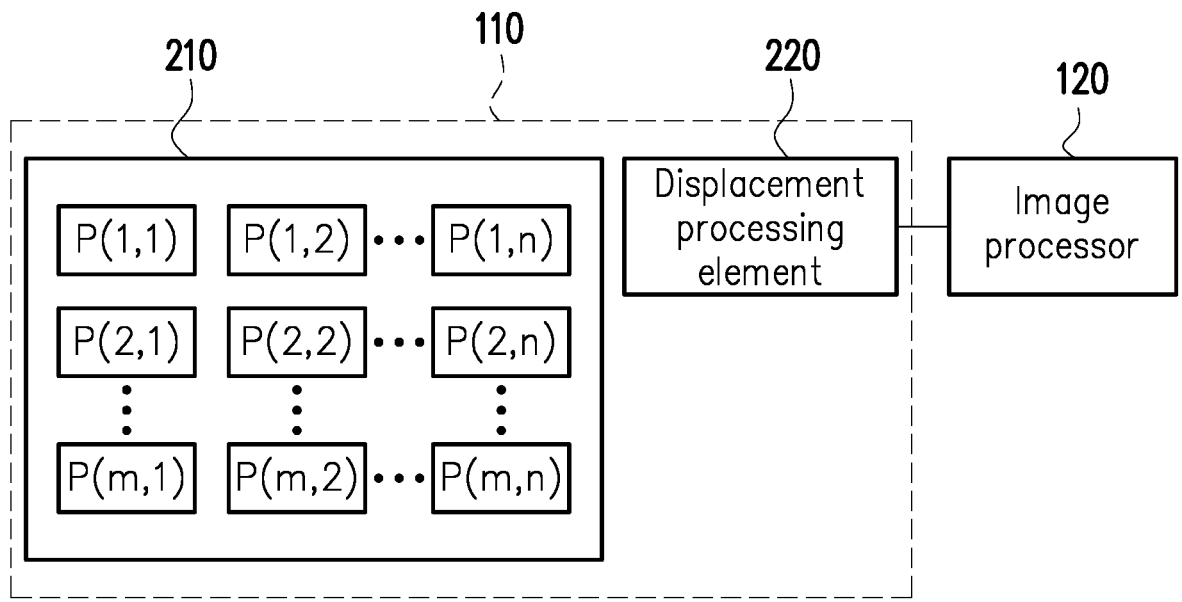
FIG. 2A and FIG. 2B are schematic diagrams of a circuit block of an image sensor of FIG. 1 according to different embodiments of the disclosure.
Figure 2B:
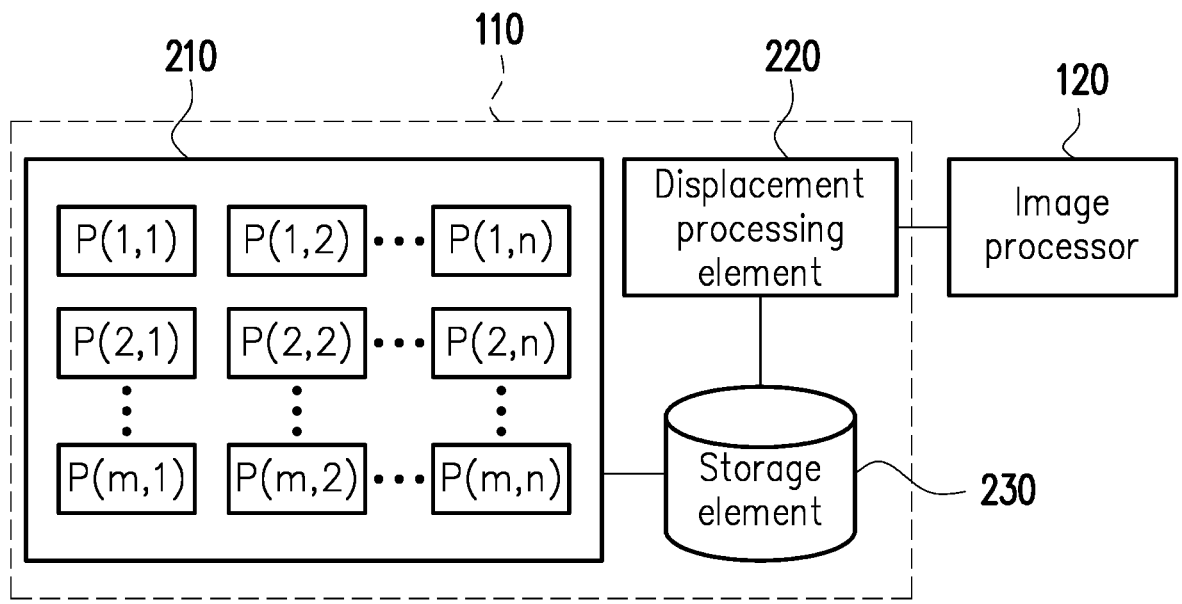

FIG. 2A and FIG. 2B are schematic diagrams of a circuit block of the image sensor 110 of FIG. 1 according to different embodiments of the disclosure. The image sensor 110 shown in FIG. 2A includes a photosensitive pixel array 210, and a displacement processing element 220. In the package of the image sensor 110, the displacement processing element 220 may be implemented on a lower chip, and the photosensitive pixel array 210 may be implemented on an upper chip. The lower chip is stacked under the upper chip, and the displacement processing element 220 may be electrically connected to the photosensitive pixel array 210 through a direct-bond interconnection (DBI) stack structure.

The image sensor 110 shown in FIG. 2B includes a photosensitive pixel array 210, a displacement processing element 220, and a storage element 230. In the package of the image sensor 110, the displacement processing element 220 and the storage element 230 may be implemented on a lower chip, and the photosensitive pixel array 210 may be implemented on an upper chip. The lower chip is stacked under the upper chip, and the displacement processing element 220 and the storage element 230 may be electrically connected to the photosensitive pixel array 210 through a DBI stack structure.

According to different design requirements, the image processor 120 and/or the displacement processing element 220 may be implemented in the form of hardware, firmware, software, or a combination of multiple of the above three. The image processor 120 and/or the displacement processing element 220 may be implemented in a logic circuit on an integrated circuit. Related functions of the image processor 120 and/or the displacement processing element 220 may be implemented as hardware using hardware description languages (for example, Verilog HDL or VHDL) or other suitable programming languages. For example, the related functions of the image processor 120 and/or the displacement processing element 220 may be implemented in one or more controllers, microcontrollers, microprocessors, application-specific integrated circuits (ASICs), digital signal processors (DSPs), field programmable gate arrays (FPGAs), and/or various logic blocks, modules, and circuits in other processing units. In terms of the form of software and/or firmware, the related functions of the image processor 120 and/or the displacement processing element 220 may be implemented as programming codes. For example, general programming languages (for example, C, C++, or assembly language) or other suitable programming languages are used to implement the image processor 120 and/or the displacement processing element 220. A central processing unit (CPU), a controller, a microcontroller, or a microprocessor may read and execute the programming codes from a non-transitory computer readable medium, thereby implementing the related functions of the image processor 120 and/or the displacement processing element 220.

Figure 3:
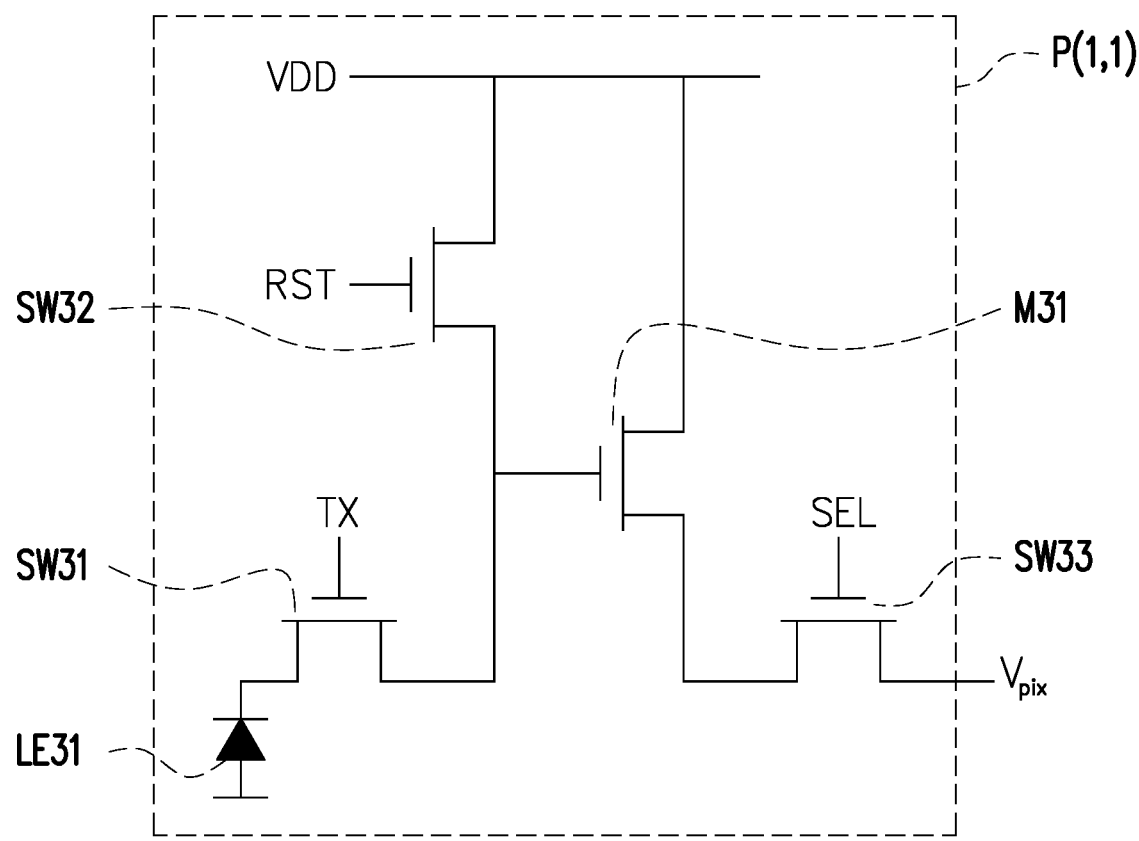
FIG. 3 is a schematic diagram of a circuit of a photosensitive pixel according to an embodiment of the disclosure.

The specific implementation of the photosensitive pixels P(1,1) to P(m,n) of the photosensitive pixel array 210 may be determined according to the actual design. For example, FIG. 3 is a schematic diagram of a circuit of the photosensitive pixel P(1,1) according to an embodiment of the disclosure. The other photosensitive pixels P(1,2) to P(m,n)

may be deduced by referring to the related description of the photosensitive pixel P(1,1), so the details are not repeated. In the embodiment shown in FIG. 3, the photosensitive pixel P(1,1) includes a photosensitive element LE31, a transmission switch SW31, a reset switch SW32, a transistor M31, and a read switch SW33. According to the actual design, the photosensitive element LE31 may be a photosensitive diode, a photosensitive transistor, or other photosensitive elements.

A first terminal of the transmission switch SW31 is coupled to a first terminal of the photosensitive element LE31. A second terminal of the photosensitive element LE31 is coupled to a reference voltage (for example, a ground voltage or other fixed voltages). A control terminal of the transmission switch SW31 is controlled by a transmission signal TX. A first terminal of the reset switch SW32 is coupled to a first voltage (for example, a supply voltage VDD). A second terminal of the reset switch SW32 is coupled to a second terminal of the transmission switch SW31. A control terminal of the reset switch SW32 is controlled by a reset signal RST. A control terminal (for example, a gate) of the transistor M31 is coupled to the second terminal of the transmission switch SW31. A first terminal (for example, a drain) of the transistor M31 is coupled to a second voltage (for example, the supply voltage VDD). A control terminal of the read switch SW33 is controlled by a read signal SEL. A first terminal of the read switch SW33 is coupled to a second terminal (for example, a source) of the transistor M31. A second terminal of the read switch SW33 is used as an output terminal of the photosensitive pixel P(1,1) to output a sensing result $V_{pix}$ of the photosensitive pixel P(1,1).

Figure 4:
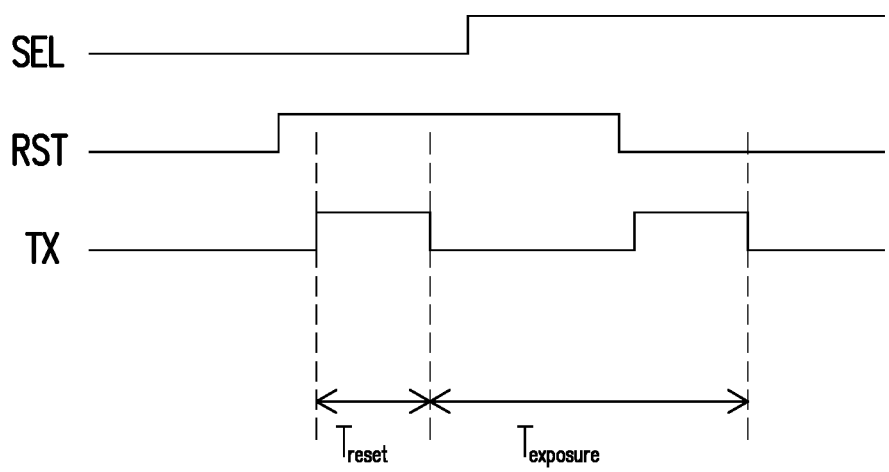
FIG. 4 is a schematic diagram of a timing sequence of a read signal, a reset signal, and a transmission signal shown in FIG. 3 according to an embodiment of the disclosure.

FIG. 4 is a schematic diagram of a timing sequence of the read signal SEL, the reset signal RST, and the transmission signal TX shown in FIG. 3 according to an embodiment of the disclosure. Please refer to FIG. 3 and FIG. 4. In a reset period $T_{reset}$, based on the control of the read signal SEL, the reset signal RST, and the transmission signal TX, the read switch SW33 is turned off and the reset switch SW32 and the transmission switch SW31 are turned on. At this time, the voltage of the photosensitive element LE31 may be reset to a level close to the supply voltage VDD. After the reset period $T_{reset}$ ends, an exposure period $T_{exposure}$ is entered.

Please refer to FIG. 2B. The storage element 230 may store a first sensing result of a photosensitive pixel (for example, the photosensitive pixel P(1,1)) at a first time point and/or store a second sensing result of the photosensitive pixel (for example, the photosensitive pixel P(1,1)) at a second time point. The displacement processing element 220 is coupled to the storage element 230 to receive the sensing result of the photosensitive pixel (for example, the photosensitive pixel P(1,1)). The displacement processing element 220 may use the first sensing result at the first time point and/or the second sensing result at the second time point to generate the displacement information. The displacement processing element 220 may transmit the image frame with the displacement information to a circuit (for example, the image processor 120) outside the image sensor 110.

Based on the above, the image sensor 110 is configured with the photosensitive pixel array 210, the displacement processing element 220, and the storage element 230. The storage element 230 may store the first sensing result of the photosensitive pixel (for example, the photosensitive pixel P(1,1)) at the first time point. Based on the second sensing result of the photosensitive pixel at the second time point and/or based on the first sensing result provided by the storage element 230, the displacement processing element 220 may generate the image frame with the displacement information to the circuit (for example, the image processor 120) outside the image sensor 110. In some operation examples, the first time point and the second time point may be different time points in the same frame period, so the image sensor 110 may transmit the displacement information to the image processor 120 in each frame period.

Figure 5:
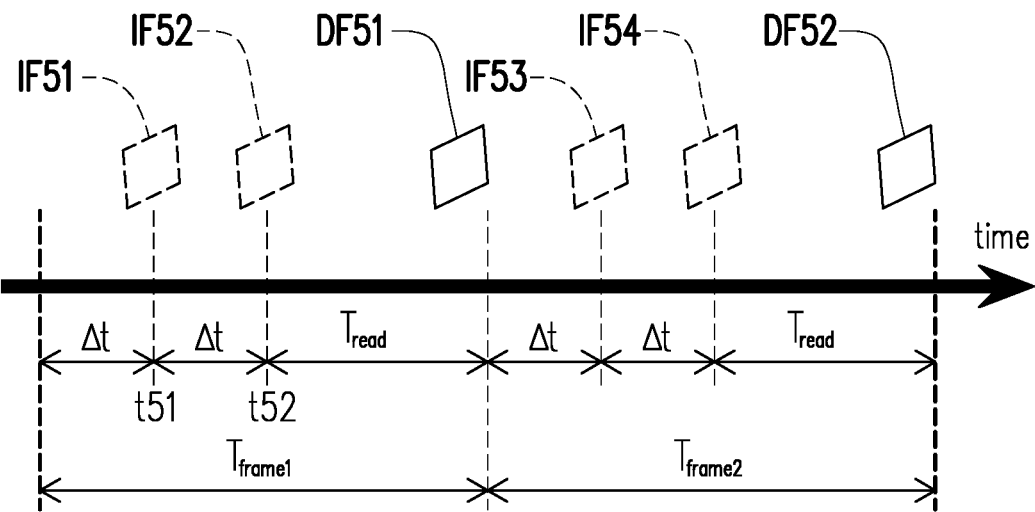
FIG. 5 is a schematic diagram of a timing sequence of an image sensor extracting sensing results of a photosensitive pixel at different time points according to an embodiment of the disclosure.

FIG. 5 is a schematic diagram of a timing sequence of the image sensor 110 extracting sensing results of a photosensitive pixel at different time points according to an embodiment of the disclosure. The horizontal axis shown in FIG. 5 represents time. FIG. 5 shows two frame periods $T_{frame1}$ and $T_{frame2}$. In the frame period $T_{frame1}$, the storage element 230 may extract and store an image frame IF51 from the photosensitive pixel array 210 at a first time point t51 after an exposure period $\Delta t$, and then extract an image frame IF52 from the photosensitive pixel array 210 at a second time point t52 after the exposure period $\Delta t$. Based on the image frame IF51 (the first sensing result) and the image frame IF52 (the second sensing result), the displacement processing element 220 may generate a displacement frame DF51 with the displacement information. Therefore, the image processor 120 outside the image sensor 110 may read the displacement frame DF51 from the image sensor 110 in a reading period $T_{read}$ of the frame period $T_{frame1}$. By analogy, the displacement processing element 220 may obtain an image frame IF53 (the first sensing result) and an image frame IF54 (the second sensing result) at different time points of the frame period $T_{frame2}$ through the storage element 230, and generate a displacement frame DF52 with the displacement information based on the image frames IF51 and IF52. Therefore, the image processor 120 may read the displacement frame DF52 from the image sensor 110 in the reading period $T_{read}$ of the frame period $T_{frame2}$. The image processor 120 may obtain the displacement information (the displacement frames DF51 and DF52) without a motion detection operation.

Figure 6A:
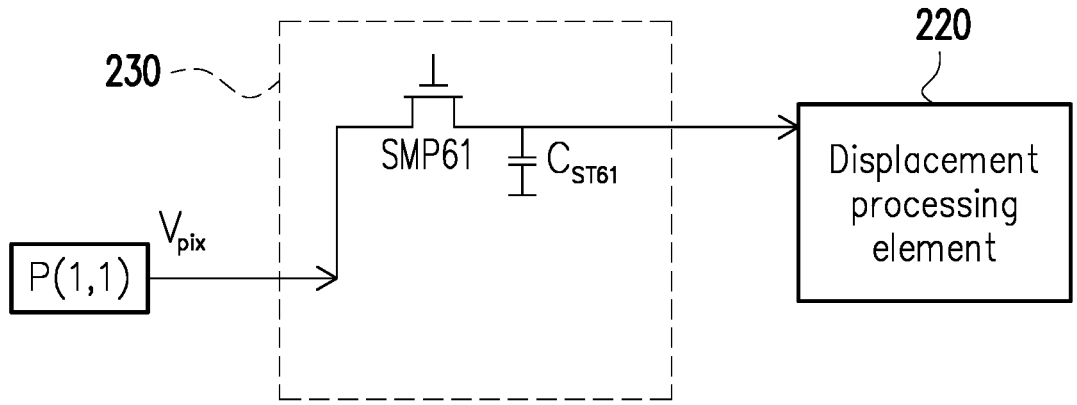
FIG. 6A and FIG. 6B are schematic diagrams of a circuit of a storage element according to different embodiments of the disclosure.
Figure 6B:
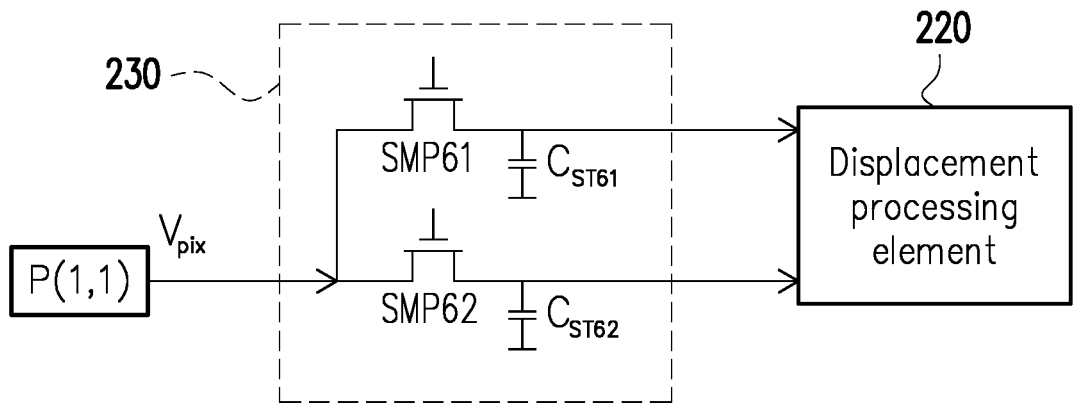

The specific implementation of the storage element 230 shown in FIG. 2B may be determined according to the actual design. For example, FIG. 6A and FIG. 6B are schematic diagrams of a circuit of the storage element 230 according to different embodiments of the disclosure. The storage element 230 shown in FIG. 6A includes a sampling switch SMP61, and a sampling capacitor $C_{ST61}$. A first terminal of the sampling switch SMP61 is coupled to a sensing result output terminal of the photosensitive pixel (for example, the photosensitive pixel P(1,1)) to receive the sensing result $V_{pix}$. A first terminal of the sampling capacitor $C_{ST61}$ is coupled to a second terminal of the sampling switch SMP61. A second terminal of the sampling capacitor $C_{ST61}$ is coupled to the reference voltage (for example, the ground voltage or other fixed voltages). The sampling switch SMP61 is turned on at the first time point, so the sampling capacitor $C_{ST61}$ may receive and store the first sensing result of the photosensitive pixel P(1,1) at the first time point through the sampling switch SMP61. The sampling capacitor $C_{ST61}$ may provide the first sensing result to the displacement processing element 220. The displacement processing element 220 may use the first sensing result of the sampling capacitor $C_{ST61}$ to generate the displacement information.

Please refer to FIG. 6B. The storage element 230 shown in FIG. 6B includes a sampling switch SMP61, a sampling capacitor $C_{ST61}$, a sampling switch SMP62, and a sampling capacitor $C_{ST62}$. The storage element 230, the sampling switch SMP61, and the sampling capacitor $C_{ST61}$ shown in FIG. 6B may be deduced by referring to the related descriptions of the storage element 230, the sampling switch SMP61, and the sampling capacitor $C_{ST61}$ shown in FIG. 6A, so the details are not repeated. In the embodiment shown in FIG. 6B, a first terminal of the sampling switch SMP62 is coupled to the sensing result output terminal of the photosensitive pixel (for example, the photosensitive pixel P(1,1)) to receive the sensing result $V_{pix}$. A first terminal of the sampling capacitor $C_{ST62}$ is coupled to a second terminal of the sampling switch SMP62. A second terminal of the sampling capacitor $C_{ST62}$ is coupled to the reference voltage (for example, the ground voltage or other fixed voltages). The sampling switch SMP62 is turned on at the second time point, so the sampling capacitor $C_{ST62}$ may receive and store the second sensing result of the photosensitive pixel P(1,1) at the second time point through the sampling switch SMP62. The sampling capacitor $C_{ST62}$ may provide the second sensing result to the displacement processing element 220. The displacement processing element 220 may use the first sensing result of the sampling capacitor $C_{ST61}$ and the second sensing result of the sampling capacitor $C_{ST62}$ to generate the displacement information.

Figure 7A:
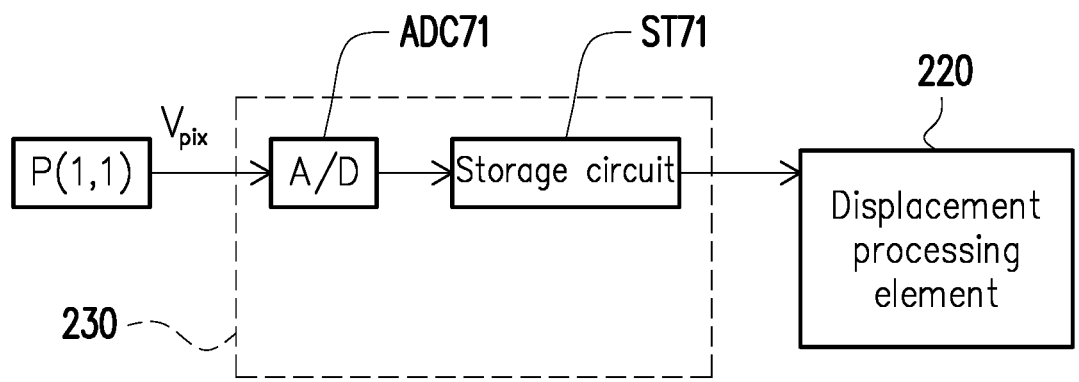
FIG. 7A and FIG. 7B are schematic diagrams of a circuit block of a storage element according to different embodiments of the disclosure.
Figure 7B:
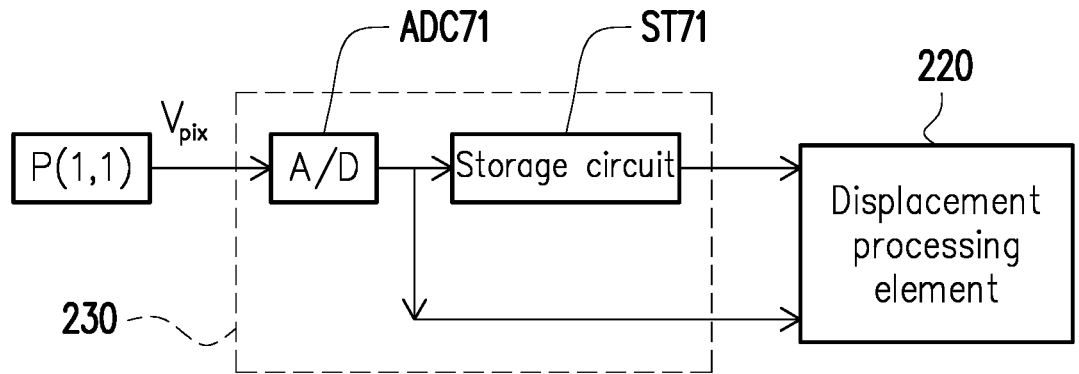

FIG. 7A and FIG. 7B are schematic diagrams of a circuit block of the storage element 230 according to different embodiments of the disclosure. The storage element 230 shown in FIG. 7A includes an analog-to-digital converter (A/D) ADC71 and a storage circuit ST71. According to the actual design, in some embodiments, the storage circuit ST71 may be implemented by one or a combination of a digital register, a static random access memory (SRAM), and a dynamic random access memory (DRAM). An input terminal of the analog-to-digital converter ADC71 is coupled to the sensing result output terminal of the photosensitive pixel (for example, the photosensitive pixel P(1,1)) to receive the sensing result $V_{pix}$. The analog-to-digital converter ADC71 converts the first sensing result of the photosensitive pixel P(1,1) into first sensing data at the first time point. An input terminal of the storage circuit ST71 is coupled to an output terminal of the analog-to-digital converter ADC71. The storage circuit ST71 stores the first sensing data at the first time point and provides the first sensing data to the displacement processing element 220. The displacement processing element 220 may use the first sensing data provided by the storage circuit ST71 to generate the displacement information.

Please refer to FIG. 7B. The storage element 230 shown in FIG. 7B includes an analog-to-digital converter ADC71 and a storage circuit ST71. The storage element 230, the analog-to-digital converter ADC71 and the storage circuit ST71 shown in FIG. 7B may be deduced by referring to the related descriptions of the storage element 230, the analog-to-digital converter ADC71 and the storage circuit ST71 shown in FIG. 7A, so the details are not repeated. In the embodiment shown in FIG. 7B, the analog-to-digital converter ADC71 also converts the second sensing result of the photosensitive pixel P(1,1) into second sensing data at the second time point. The analog-to-digital converter ADC71 may provide the second sensing data to the displacement processing element 220 at the second time point. The displacement processing element 220 may use the first sensing data provided by the storage circuit ST71 and the second sensing data provided by the analog-to-digital converter ADC71 to generate the displacement information.

Figure 8:
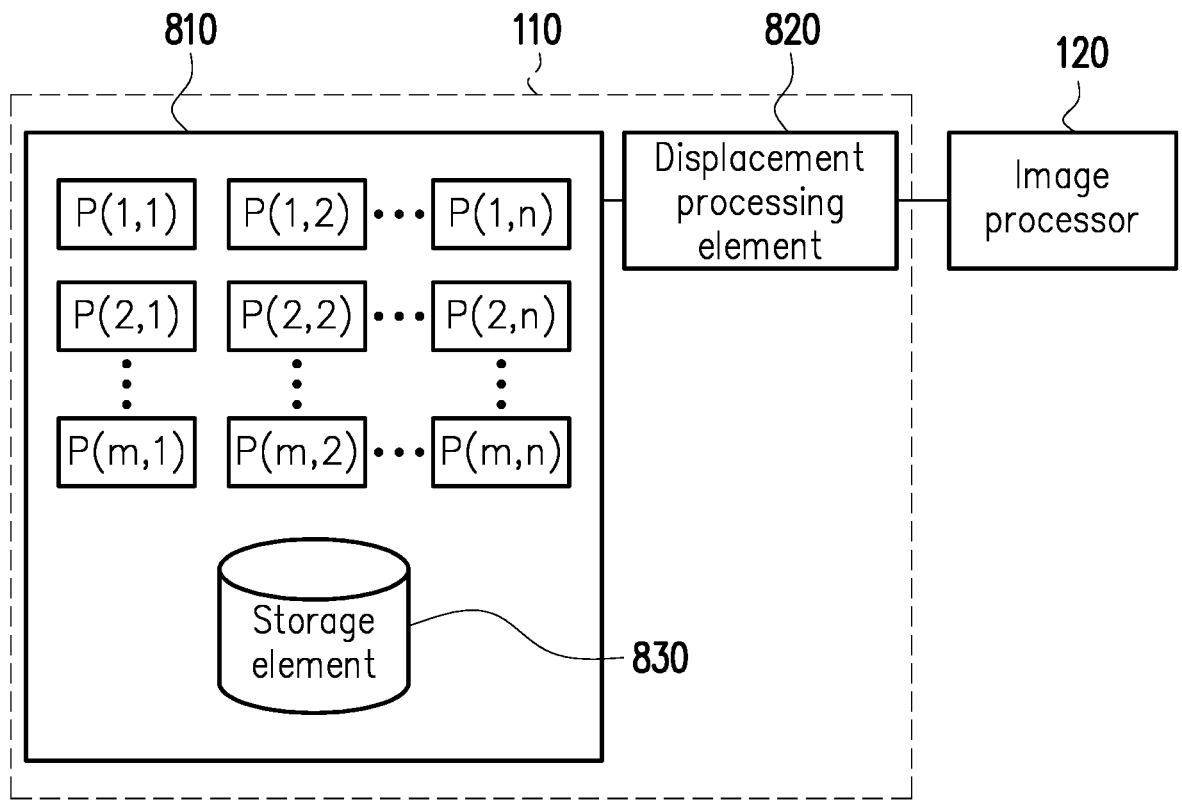
FIG. 8 is a schematic diagram of a circuit block of the image sensor of FIG. 1 according to another embodiment of the disclosure.

FIG. 8 is a schematic diagram of a circuit block of the image sensor 110 of FIG. 1 according to another embodiment of the disclosure. The image sensor 110 shown in FIG. 8 includes a photosensitive pixel array 810, a displacement processing element 820, and a storage element 830. In the embodiment shown in FIG. 8, the storage element 830 may be integrated in the photosensitive pixel array 810. For example, the storage element 830 may be stacked under the photosensitive pixel array 810, and the storage element 830 may be electrically connected to the photosensitive pixel array 810 through the direct-bond interconnection (DBI) stack structure. The photosensitive pixel array 810 shown in FIG. 8 may be deduced by referring to the related description of the photosensitive pixel array 210 shown in FIG. 2A or FIG. 2B. The displacement processing element 820 and the storage element 830 shown in FIG. 8 may be deduced by referring to the related descriptions of the displacement processing element 220 and the storage element 230 shown in FIG. 2B and/or to the related descriptions of the displacement processing element 220 and the storage element 230 shown in FIG. 6A, FIG. 6B, FIG. 7A or FIG. 7B, so the details are not repeated.

Figure 9:
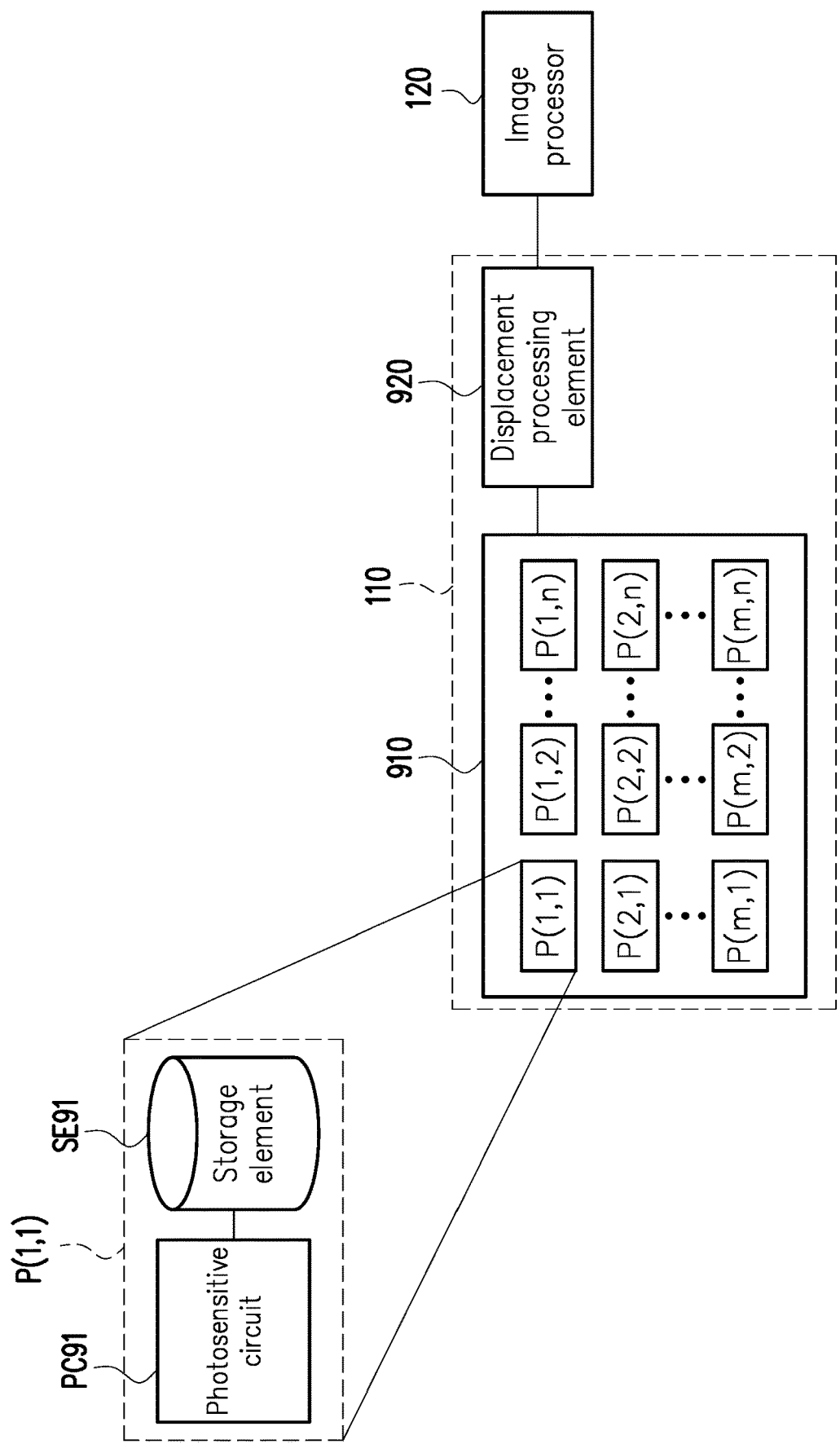
FIG. 9 is a schematic diagram of a circuit block of the image sensor of FIG. 1 according to still another embodiment of the disclosure.

FIG. 9 is a schematic diagram of a circuit block of the image sensor 110 of FIG. 1 according to still another embodiment of the disclosure. The image sensor 110 shown in FIG. 9 includes a photosensitive pixel array 910 and a displacement processing element 920. In the embodiment shown in FIG. 9, the storage element 230 may be integrated in each photosensitive pixel. For example, a storage element SE91 may be integrated in the photosensitive pixel P(1,1). The other photosensitive pixels P(1,2) to P(m,n) may be deduced by referring to the related description of the photosensitive pixel P(1,1), so the details are not repeated. The photosensitive pixel array 910 and the displacement processing element 920 shown in FIG. 9 may be deduced by referring to the related descriptions of the photosensitive pixel array 210 and the displacement processing element 220 shown in FIG. 2A or FIG. 2B, so the details are not repeated.

In the embodiment shown in FIG. 9, the photosensitive pixel P(1,1) includes a photosensitive circuit PC91 and the storage element SE91. The storage element SE91 is coupled to the photosensitive circuit PC91. The storage element SE91 may store the first sensing result of the photosensitive circuit PC91 of the photosensitive pixel P(1,1) at the first time point. The displacement processing element 920 is coupled to the storage element SE91 to receive the first sensing result. The displacement processing element 920 may use the first sensing result provided by the storage element SE91 to generate the displacement information. The displacement processing element 920 may transmit the image frame with the displacement information to the circuit (for example, the image processor 120) outside the image sensor 110. The image processor 120 may obtain the displacement information (for example, the displacement frames DF51 and DF52 shown in FIG. 5) without a motion detection operation.

Figure 10A:
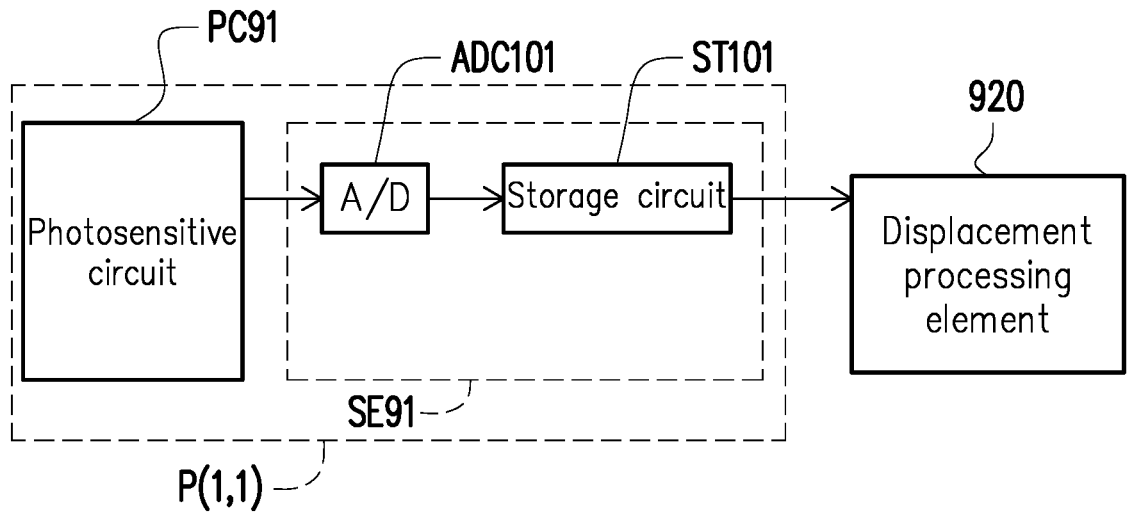
FIG. 10A and FIG. 10B are schematic diagrams of a circuit block of a storage element shown in FIG. 9 according to different embodiments of the disclosure.
Figure 10B:
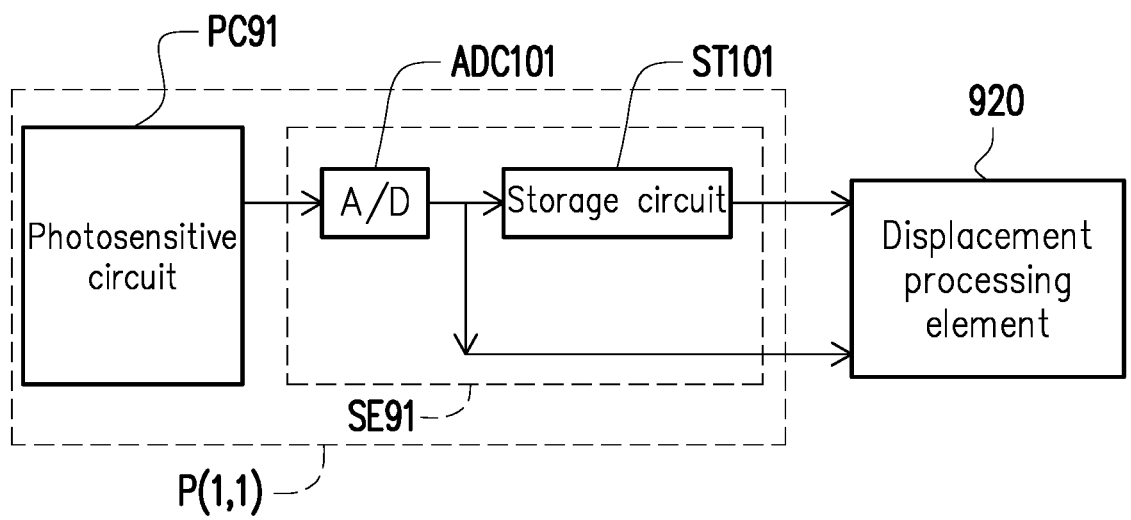

The specific implementation of the storage element SE91 shown in FIG. 9 may be determined according to the actual design. For example, FIG. 10A and FIG. 10B are schematic diagrams of a circuit block of the storage element SE91 shown in FIG. 9 according to different embodiments of the disclosure. The storage element SE91 shown in FIG. 10A includes an analog-to-digital converter (A/D) ADC101 and a storage circuit ST101. According to the actual design, in some embodiments, the storage circuit ST101 may be implemented by one or a combination of a digital register, an SRAM, and a DRAM. An input terminal of the analog-to-digital converter ADC101 is coupled to an output terminal of the photosensitive circuit PC91. The analog-to-digital converter ADC101 converts the first sensing result of the photosensitive circuit PC91 at the first time point into the first sensing data. An input terminal of the storage circuit ST101 is coupled to an output terminal of the analog-to-digital converter ADC101 to receive the first sensing data. The storage circuit ST101 stores the first sensing data at the first time point and provides the first sensing data to the displacement processing element 920. The displacement processing element 920 may use the first sensing data provided by the storage circuit ST101 to generate the displacement information.

Please refer to FIG. 10B. The storage element SE91 shown in FIG. 10B includes an analog-to-digital converter (A/D) ADC101 and a storage circuit ST101. The storage element SE91, the analog-to-digital converter ADC101 and the storage circuit ST101 shown in FIG. 10B may be deduced by referring to the related descriptions of the storage element SE91, the analog-to-digital converter ADC101 and the storage circuit ST101 shown in FIG. 10A, so the details are not repeated. In the embodiment shown in FIG. 10B, the analog-to-digital converter ADC101 also converts the second sensing result of the photosensitive circuit PC91 at the second time point into the second sensing data. The analog-to-digital converter ADC101 may provide the second sensing data to the displacement processing element 920 at the second time point. The displacement processing element 920 may use the first sensing data provided by the storage circuit ST101 and the second sensing data provided by the analog-to-digital converter ADC101 to generate the displacement information.

Figure 11:
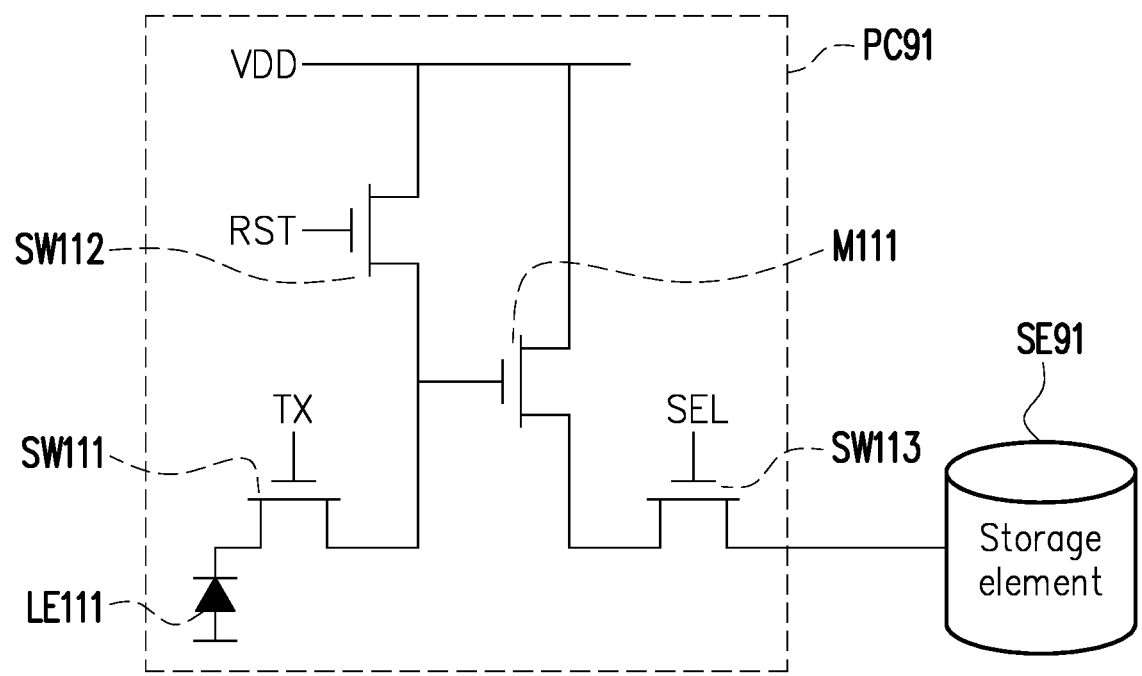
FIG. 11 is a schematic diagram of a circuit of a photosensitive circuit shown in FIG. 9 according to an embodiment of the disclosure.

The specific implementation of the photosensitive circuit PC91 shown in FIG. 9 may be determined according to the actual design. For example, FIG. 11 is a schematic diagram of a circuit of the photosensitive circuit PC91 shown in FIG. 9 according to an embodiment of the disclosure. In the embodiment shown in FIG. 11, the photosensitive circuit PC91 includes a photosensitive element LE111, a transmission switch SW111, a reset switch SW112, a transistor M111, and a read switch SW113. The photosensitive element LE111, the transmission switch SW111, the reset switch SW112, the transistor M111, and the read switch SW113 shown in FIG. 11 may be deduced by referring to the related descriptions of the photosensitive element LE11, the transmission switch SW31, the reset switch SW32, the transistor M31, and the read switch SW33 shown in FIG. 3, so the details are not repeated. In the embodiment shown in FIG. 11, a second terminal of the read switch SW113 is used as the output terminal of the photosensitive circuit PC91 to output the sensing result of the photosensitive circuit PC91 to the storage element SE91.

Figure 12A:
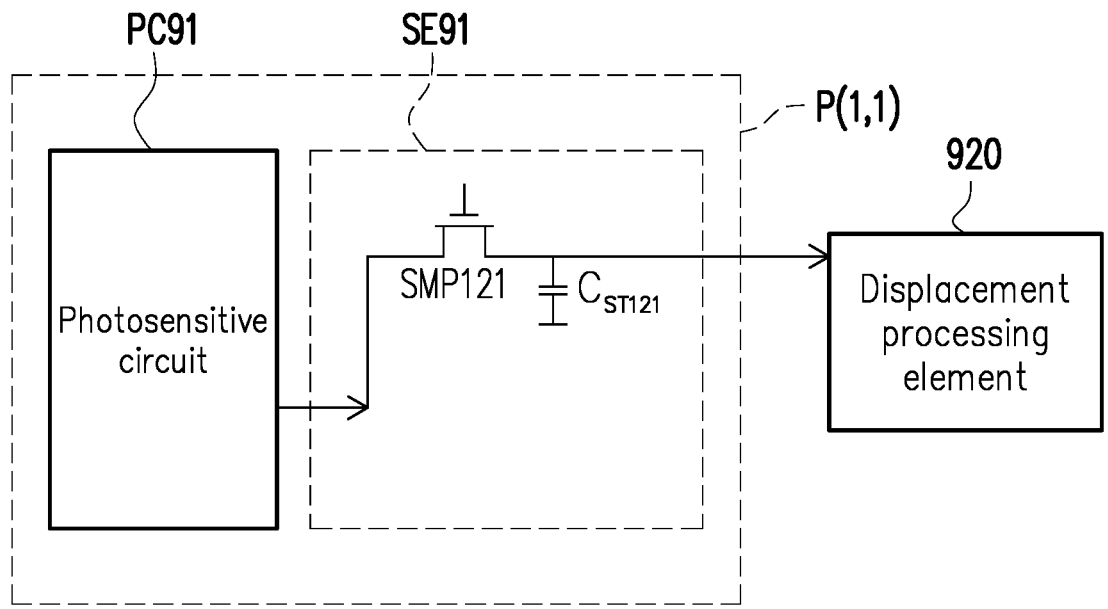
FIG. 12A and FIG. 12B are schematic diagrams of a circuit of the storage element shown in FIG. 9 according to different embodiments of the disclosure.
Figure 12B:
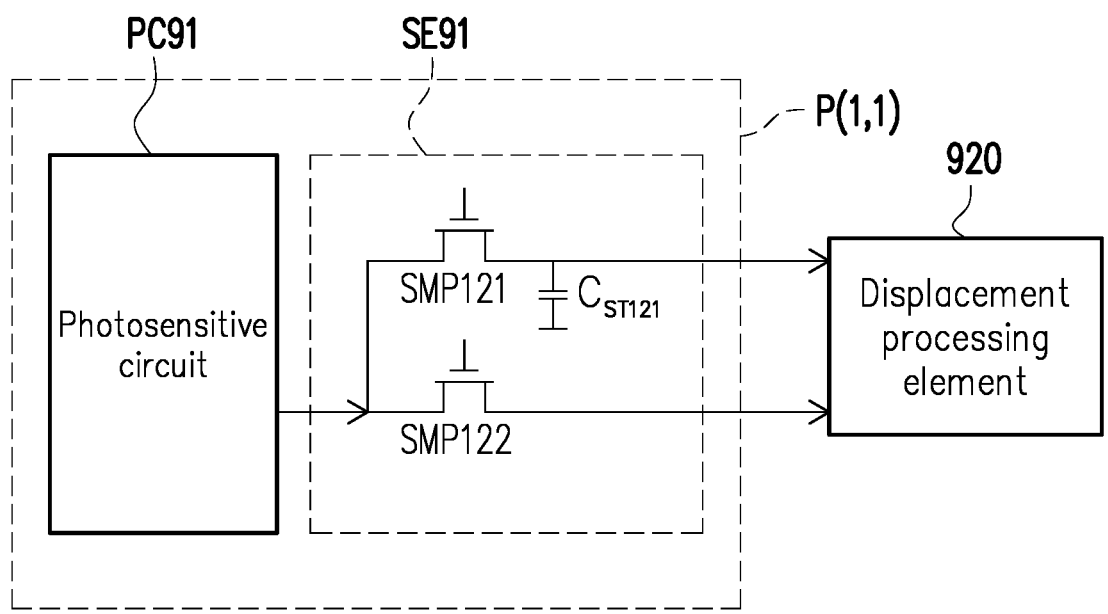

FIG. 12A and FIG. 12B are schematic diagrams of a circuit of the storage element SE91 shown in FIG. 9 according to different embodiments of the disclosure. The photosensitive circuit PC91 shown in FIG. 12 may be deduced by referring to the related description of the photosensitive circuit PC91 shown in FIG. 9, FIG. 10A or FIG. 10B, so the details are not repeated. The storage element SE91 shown in FIG. 12A includes a sampling switch SMP121, and a sampling capacitor $C_{ST121}$. A first terminal of the sampling switch SMP121 is coupled to the output terminal of the photosensitive circuit PC91 to receive the sensing result. A second terminal of the sampling switch SMP121 is coupled to the displacement processing element 920. A first terminal of the sampling capacitor $C_{ST121}$ is coupled to a second terminal of the sampling switch SMP121. A second terminal of the sampling capacitor $C_{ST121}$ is coupled to the reference voltage (for example, the ground voltage or other fixed voltages). The sampling switch SMP121 is turned on at the first time point, so the sampling capacitor $C_{ST121}$ may receive and store the first sensing result of the photosensitive circuit PC91 at the first time point through the sampling switch SMP121. The sampling capacitor $C_{ST61}$ may provide the first sensing result to the displacement processing element 920. The displacement processing element 920 may use the first sensing result from the sampling capacitor $C_{ST121}$ to generate the displacement information.

Please refer to FIG. 12B. The storage element SE91 shown in FIG. 12B includes a sampling switch SMP121, a sampling capacitor $C_{ST121}$, and a sampling switch SMP122. The storage element SE91, the sampling switch SMP121, and the sampling capacitor $C_{ST121}$ shown in FIG. 12B may be deduced by referring to the related descriptions of the storage element SE91, the sampling switch SMP121, and the sampling capacitor $C_{ST121}$ shown in FIG. 12A, so the details are not repeated. In the embodiment shown in FIG. 12B, a first terminal of the sampling switch SMP122 is coupled to the output terminal of the photosensitive circuit PC91 to receive the sensing result. A second terminal of the sampling switch SMP122 is coupled to the displacement processing element 920. The sampling switch SMP122 is turned on at the second time point to provide the second sensing result of the photosensitive circuit PC91 at the second time point to the displacement processing element 920. The displacement processing element 920 may use the first sensing result from the sampling capacitor $C_{ST121}$ and the second sensing result from the sampling switch SMP122 to generate the displacement information.

Figure 13:
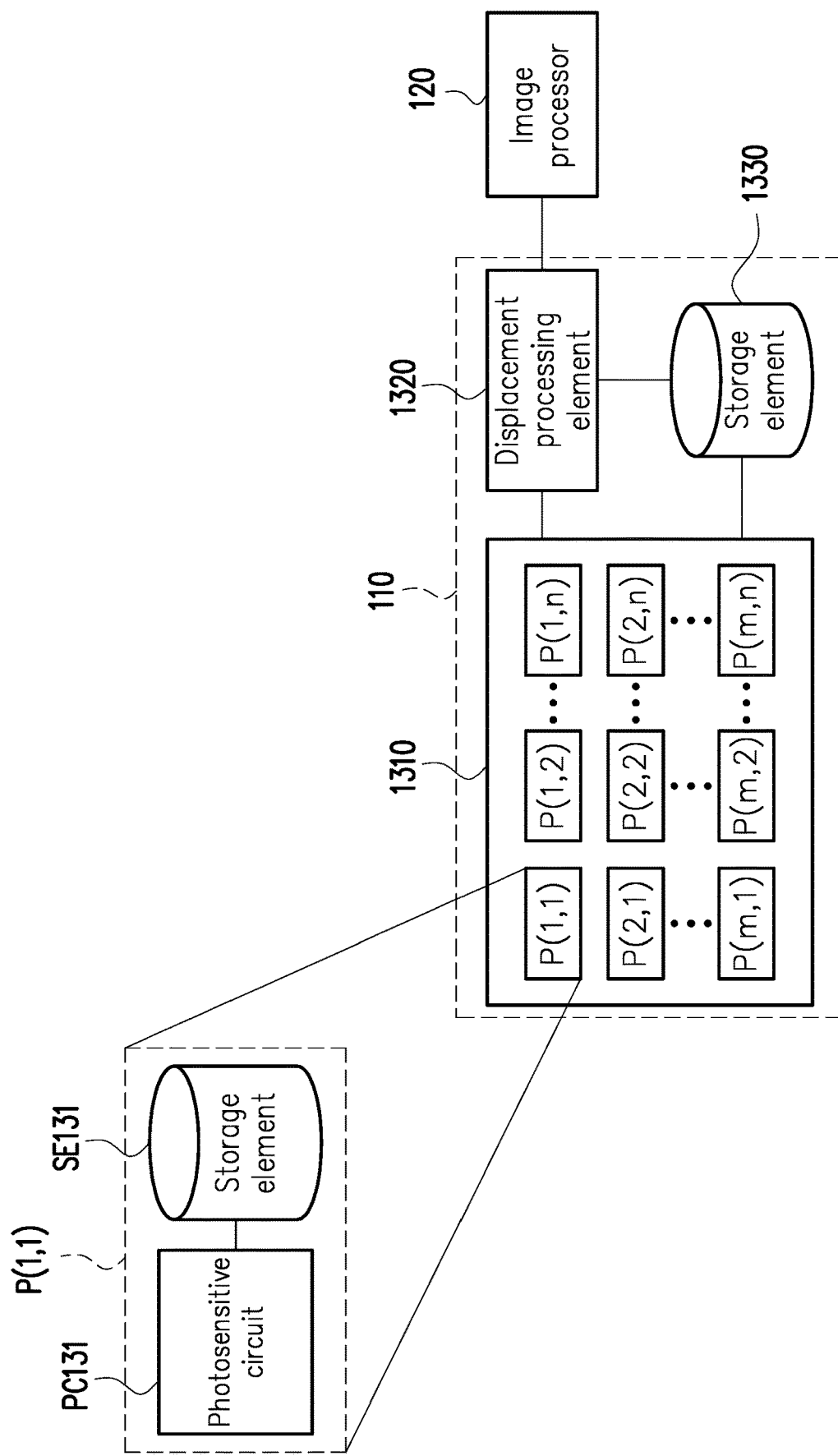
FIG. 13 is a schematic diagram of a circuit block of the image sensor of FIG. 1 according to yet another embodiment of the disclosure.

FIG. 13 is a schematic diagram of a circuit block of the image sensor 110 of FIG. 1 according to yet another embodiment of the disclosure. The image sensor 110 shown in FIG. 13 includes a photosensitive pixel array 1310, a displacement processing element 1320, and a storage element 1330. The photosensitive pixel array 1310, the displacement processing element 1320, and the storage element 1330 shown in FIG. 13 may be deduced by referring to the related descriptions of the photosensitive pixel array 210, the displacement processing element 220, and the storage element 230 shown in FIG. 2B. The photosensitive pixel array 1310 and the displacement processing element 1320 shown in FIG. 13 may be deduced by referring to the related descriptions of the photosensitive pixel array 910 and the displacement processing element 920 shown in FIG. 9, so the details are not repeated.

In the embodiment shown in FIG. 13, each photosensitive pixel includes a photosensitive circuit and a storage element. For example, the photosensitive pixel P(1,1) includes a photosensitive circuit PC131 and a storage element SE131. The storage element of each photosensitive pixel may store the first sensing result of the corresponding pixel at the first time point. For example, the storage element SE131 may store the first sensing result of the photosensitive pixel P(1,1) at the first time point. The storage element 1330 may store the second sensing results of all the photosensitive pixels P(1,1) to P(m,n) at the second time point. The displacement processing element 1320 may use the first sensing data provided by the storage elements (for example, the storage elements SE131) of the photosensitive pixels P(1,1) to P(m,n) and the second sensing data provided by the storage element 1330 to generate the displacement information.

Figure 14A:
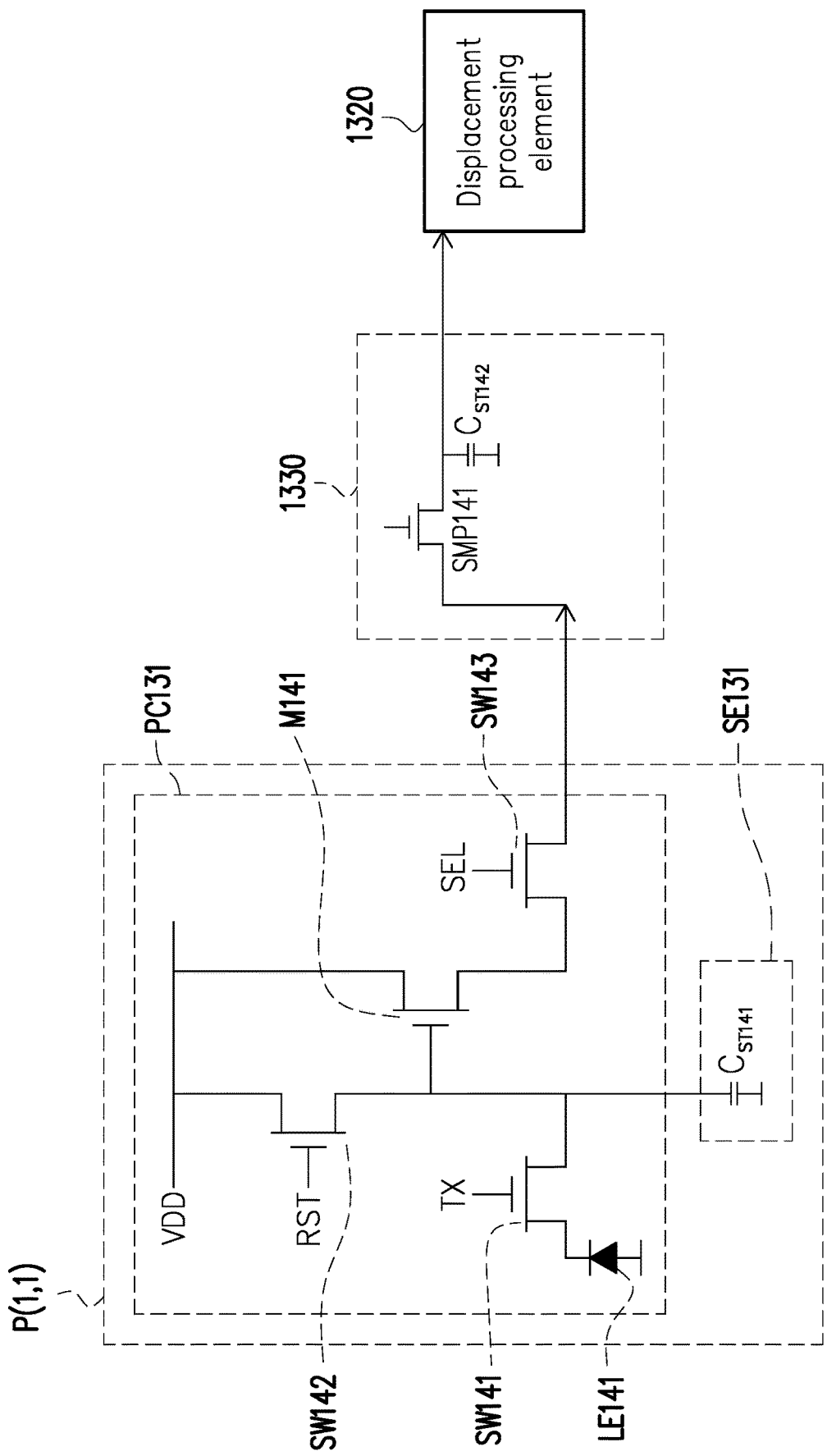
FIG. 14A and FIG. 14B are schematic diagrams of a circuit block of a photosensitive pixel and a storage element shown in FIG. 13 according to different embodiments of the disclosure.
Figure 14B:
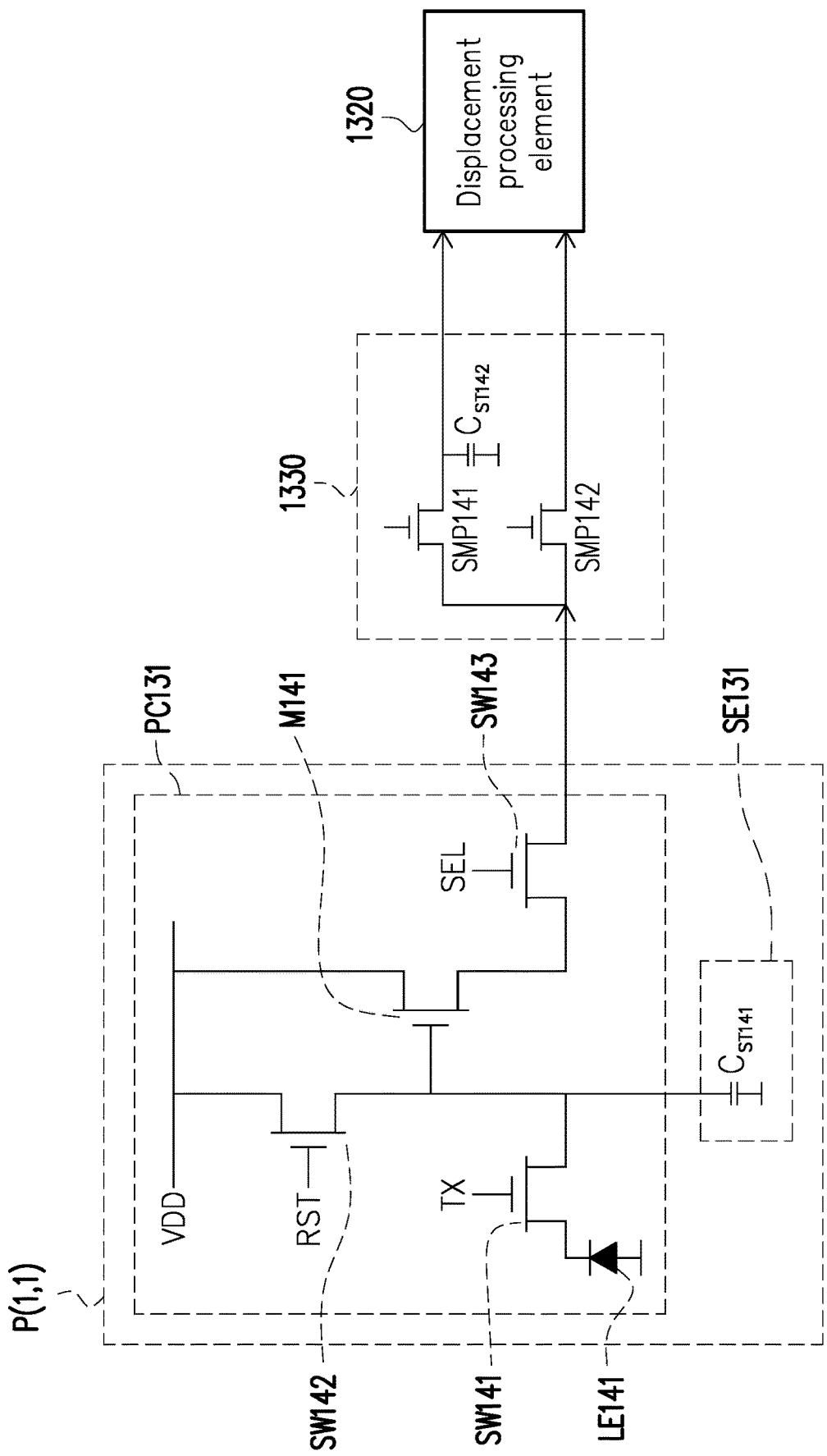

FIG. 14A and FIG. 14B are schematic diagrams of a circuit block of the photosensitive pixel P(1,1) and the storage element 1330 shown in FIG. 13 according to different embodiments of the disclosure. The photosensitive pixel P(1,1) shown in FIG. 14A includes a photosensitive circuit PC131 and a storage element SE131. The storage element SE131 shown in FIG. 14A includes a sampling capacitor $C_{ST141}$, and the photosensitive circuit PC131 includes a photosensitive element LE141, a transmission switch SW141, a reset switch SW142, a transistor M141, and a read switch SW143. The photosensitive element LE141, the transmission switch SW141, the reset switch SW142, the transistor M141, and the read switch SW143 shown in FIG. 14A may be deduced by referring to the related descriptions of the photosensitive element LE111, the transmission switch SW111, the reset switch SW112, the transistor M111, and the read switch SW113 shown in FIG. 11, so the details are not repeated. In the embodiment shown in FIG. 14A, a first terminal of the sampling capacitor $C_{ST141}$ (the storage element SE131) is coupled to a second terminal of the transmission switch SW141, and a second terminal of the sampling capacitor $C_{ST141}$ is coupled to the reference voltage (for example, the ground voltage or other fixed voltages).

In the embodiment shown in FIG. 14A, the storage element 1330 includes a sampling switch SMP141, and a sampling capacitor $C_{ST142}$. A first terminal of the sampling switch SMP141 is coupled to the output terminal of the photosensitive pixel P(1,1), that is, to a second terminal of the read switch SW143. A second terminal of the sampling switch SMP141 is coupled to the displacement processing element 1320. A first terminal of the sampling capacitor $C_{ST142}$ is coupled to a second terminal of the sampling switch SMP141. A second terminal of the sampling capacitor $C_{ST142}$ is coupled to the reference voltage (for example, the ground voltage or other fixed voltages). The displacement processing element 1320 may use the sensing result from the sampling capacitor $C_{ST142}$ to generate the displacement information.

In the embodiment shown in FIG. 14B, the storage element 1330 includes a sampling switch SMP141, a sampling capacitor $C_{ST142}$, and a sampling switch SMP142. The photosensitive pixel P(1,1), the storage element 1330, the sampling switch SMP141, the sampling capacitor $C_{ST142}$, and the displacement processing element 1320 shown in FIG. 14B may be deduced by referring to the related descriptions of the photosensitive pixel P(1,1), the storage element 1330, the sampling switch SMP141, the sampling capacitor $C_{ST142}$, and the displacement processing element 1320 shown in FIG. 14A, so the details are not repeated. In the embodiment shown in FIG. 14B, a first terminal of the sampling switch SMP142 is coupled to the output terminal of the photosensitive pixel P(1,1). A second terminal of the sampling switch SMP142 is coupled to the displacement processing element 1320. The displacement processing element 1320 may use the first sensing result from the sampling capacitor $C_{ST141}$ and the second sensing result from the sampling capacitor $C_{ST142}$ to generate the displacement information.

Figure 15A:
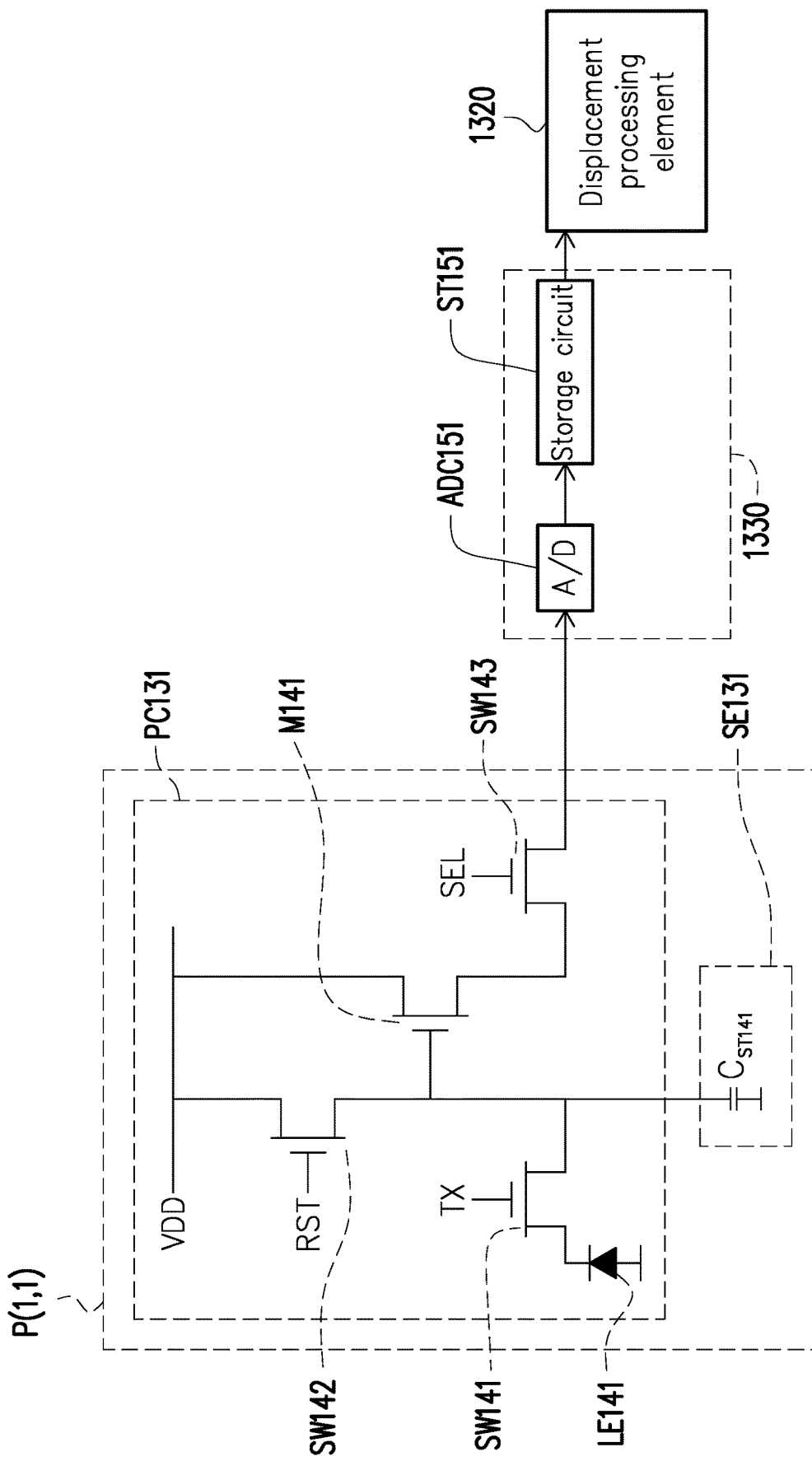
FIG. 15A and FIG. 15B are schematic diagrams of a circuit block of the photosensitive pixel and the storage element shown in FIG. 13 according to different embodiments of the disclosure.
Figure 15B:
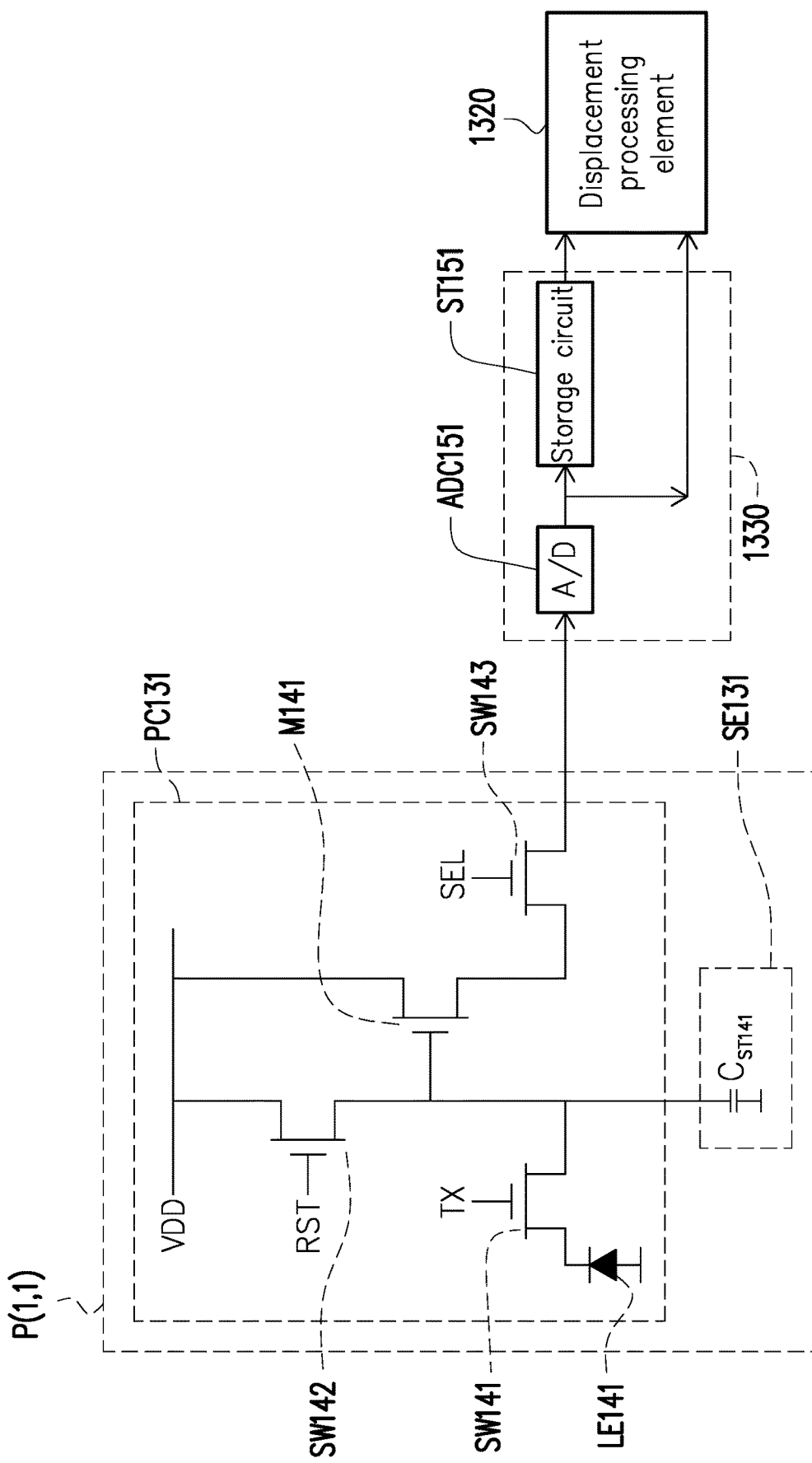

FIG. 15A and FIG. 15B are schematic diagrams of a circuit block of the photosensitive pixel P(1,1) and the storage element 1330 shown in FIG. 13 according to different embodiments of the disclosure. The photosensitive pixel P(1,1) shown in FIG. 15A includes a photosensitive circuit PC131 and a storage element SE131. The photosensitive circuit PC131 and the storage element SE131 shown in FIG. 15A may be deduced by referring to the related descriptions of the photosensitive circuit PC131 and the storage element SE131 shown in FIG. 14A or FIG. 14B, so the details are not repeated. In the embodiment shown in FIG. 15A, the storage element 1330 includes an analog-to-digital converter (A/D) ADC151 and a storage circuit ST151. According to the actual design, in some embodiments, the storage circuit ST151 may be implemented by one or a combination of a digital register, an SRAM, and a DRAM. An input terminal of the analog-to-digital converter ADC151 is coupled to the output terminal of the photosensitive pixel P(1,1). An input terminal of the storage circuit ST151 is coupled to an output terminal of the analog-to-digital converter ADC151. An output terminal of the storage circuit ST151 is coupled to the displacement processing element 1320. The displacement processing element 1320 may use the sensing result from the storage circuit ST151 to generate the displacement information.

In the embodiment shown in FIG. 15B, the storage element 1330 includes an analog-to-digital converter (A/D) ADC151 and a storage circuit ST151. The photosensitive pixel P(1,1), the analog-to-digital converter ADC151, the storage circuit ST151, and the displacement processing element 1320 shown in FIG. 15B may be deduced by referring to the related descriptions of the photosensitive pixel P(1,1), the analog-to-digital converter ADC151, the storage circuit ST151, and the displacement processing element 1320 shown in FIG. 15A, so the details are not repeated. In the embodiment shown in FIG. 15B, the output terminal of the analog-to-digital converter ADC151 is coupled to the displacement processing element 1320. The analog-to-digital converter ADC151 also converts the second sensing result of the photosensitive circuit PC131 at the second time point into the second sensing data. The analog-to-digital converter ADC151 may provide the second sensing data to the displacement processing element 1320 at the second time point. The displacement processing element 1320 may use the first sensing data provided by the storage circuit ST151 and the second sensing data provided by the analog-to-digital converter ADC151 to generate the displacement information.

Figure 16A:
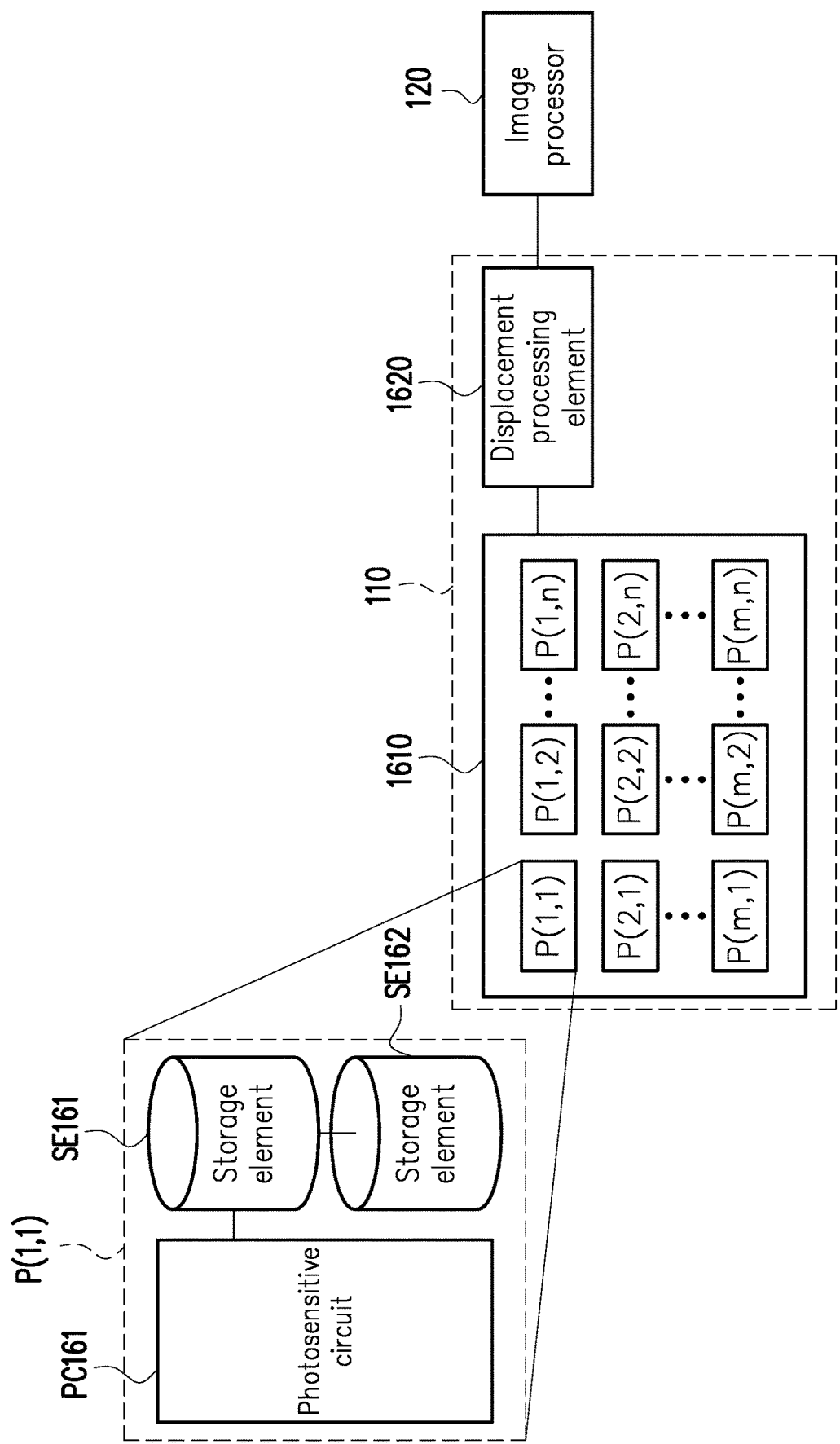
FIG. 16A and FIG. 16B are schematic diagrams of a circuit block of the image sensor of FIG. 1 according to different embodiments of the disclosure.
Figure 16B:
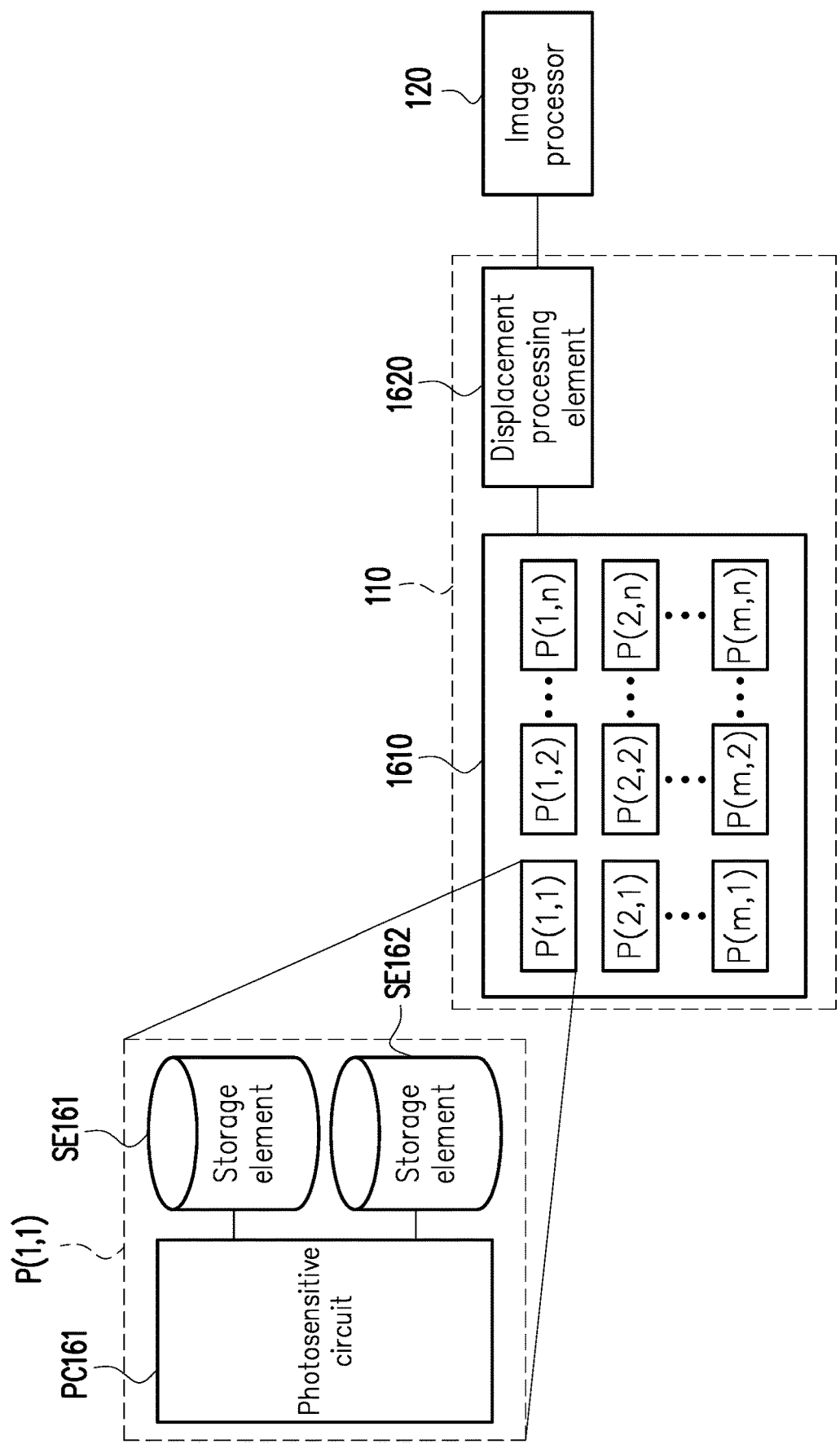

FIG. 16A and FIG. 16B are schematic diagrams of a circuit block of the image sensor 110 of FIG. 1 according to different embodiments of the disclosure. The image sensor 110 shown in FIG. 16A includes a photosensitive pixel array 1610 and a displacement processing element 1620. The photosensitive pixel array 1610 and the displacement processing element 1620 shown in FIG. 16A may be deduced by referring to the related descriptions of the photosensitive pixel array 210 and the displacement processing element 220 shown in FIG. 2A or FIG. 2B, so the details are not repeated. In the embodiment shown in FIG. 16A, the storage element 230 may be integrated in each photosensitive pixel. For example, a storage element SE161 and a storage element SE162 may be integrated in the photosensitive pixel P(1,1). The other photosensitive pixels P(1,2) to P(m,n) may be deduced by referring to the related description of the photosensitive pixel P(1,1), so the details are not repeated.

In the embodiment shown in FIG. 16A, the photosensitive pixel P(1,1) includes a photosensitive circuit PC161, the storage element SE161, and the storage element SE162. The storage element SE161 is coupled to the photosensitive circuit PC161, and the storage element SE162 is coupled to the storage element SE161. At the first time point, the storage element SE161 may store the first sensing result of the photosensitive circuit PC161 of the photosensitive pixel P(1,1). At the second time point, the storage element SE162 may store the first sensing result provided from the storage element SE161, and the storage element SE161 may store the second sensing result of the photosensitive circuit PC161. The displacement processing element 1620 is coupled to the storage element SE161 and the storage element SE162 to receive the first sensing result and the second sensing result. The displacement processing element 1620 may use the first sensing result and the second sensing result to generate the displacement information. The displacement processing element 1620 may transmit the image frame with the displacement information to the circuit (for example, the image processor 120) outside the image sensor 110. The image processor 120 may obtain the displacement information (for example, the displacement frames DF51 and DF52 shown in FIG. 5) without a motion detection operation.

The image sensor 110 shown in FIG. 16B includes a photosensitive pixel array 1610 and a displacement processing element 1620. The photosensitive pixel array 1610 and the displacement processing element 1620 shown in FIG. 16B may be deduced by referring to the related descriptions of the photosensitive pixel array 210 and the displacement processing element 220 shown in FIG. 2A or FIG. 2B, so the details are not repeated. In the embodiment shown in FIG. 16B, the storage element 230 may be integrated in each photosensitive pixel. For example, a storage element SE161 and a storage element SE162 may be integrated in the photosensitive pixel P(1,1). The other photosensitive pixels P(1,2) to P(m,n) may be deduced by referring to the related description of the photosensitive pixel P(1,1), so the details are not repeated.

In the embodiment shown in FIG. 16B, the photosensitive pixel P(1,1) includes a photosensitive circuit PC161, the storage element SE161, and the storage element SE162. The storage element SE161 and the storage element SE162 are coupled to the photosensitive circuit PC161. The storage element SE161 may store the first sensing result of the photosensitive circuit PC161 of the photosensitive pixel P(1,1) at the first time point. The storage element SE162 may store the second sensing result of the photosensitive circuit PC161 at the second time point. The displacement processing element 1620 is coupled to the storage element SE161 and the storage element SE162 to receive the first sensing result and the second sensing result. The displacement processing element 1620 may use the first sensing result and the second sensing result to generate the displacement information. The displacement processing element 1620 may transmit the image frame with the displacement information to the circuit (for example, the image processor 120) outside the image sensor 110. The image processor 120 may obtain the displacement information (for example, the displacement frames DF51 and DF52 shown in FIG. 5) without a motion detection operation.

Figure 17A:
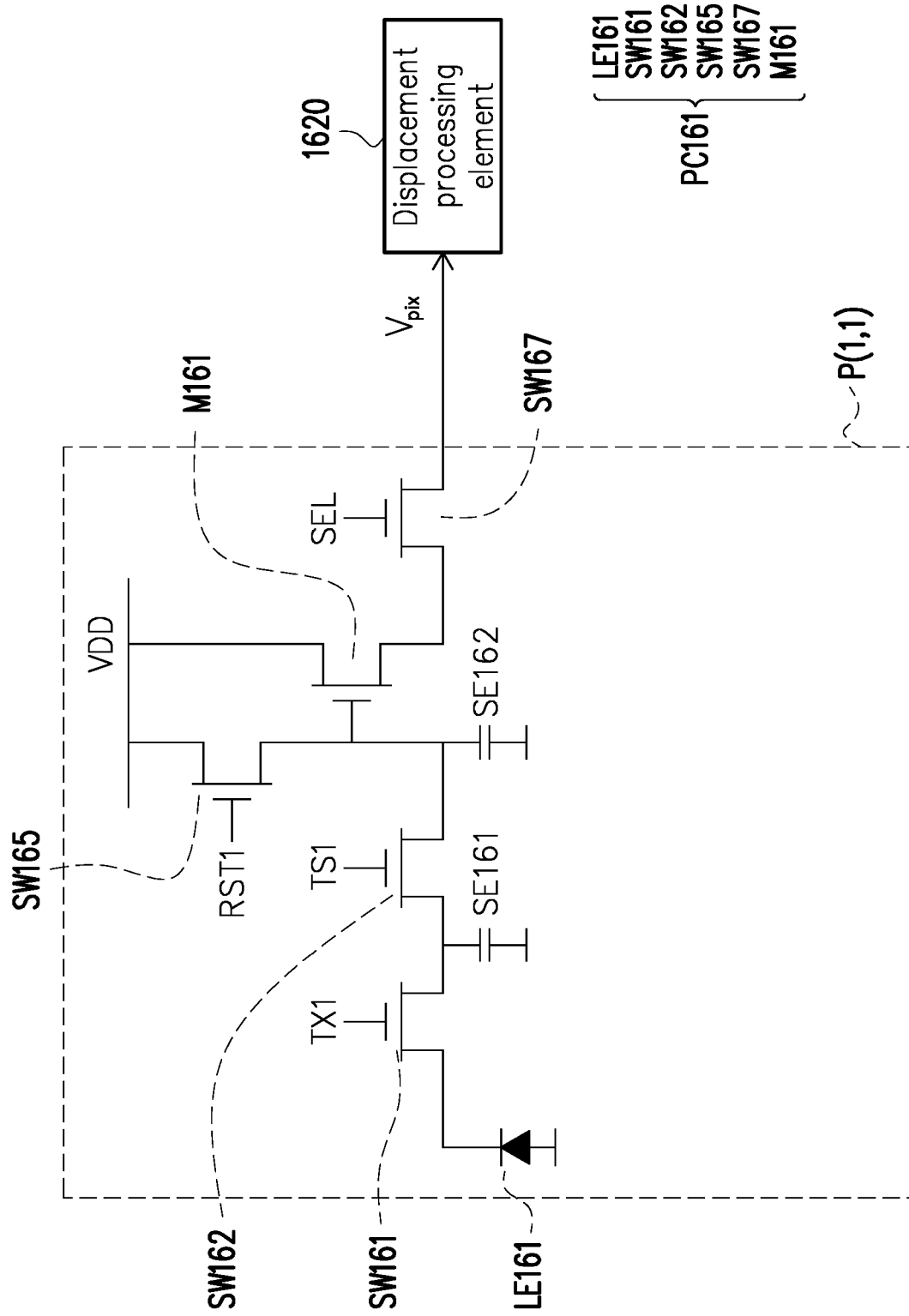
FIG. 17A and FIG. 17B are schematic diagrams of a circuit block of a photosensitive circuit and a storage element shown in FIG. 16A or FIG. 16B according to different embodiments of the disclosure.
Figure 17B:
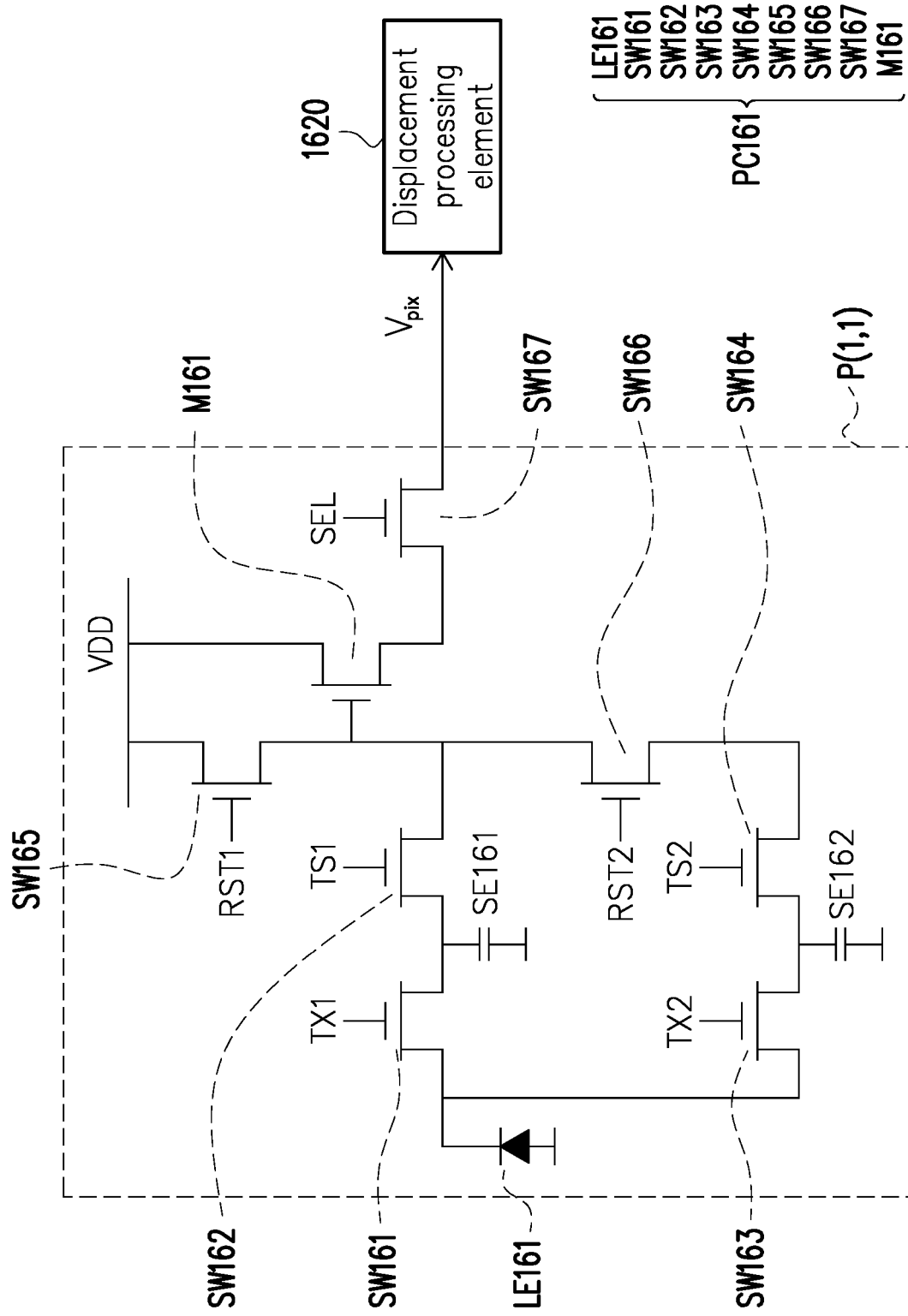

The specific implementation of the photosensitive circuit PC161, the storage element SE161, and the storage element SE162 shown in FIG. 16B may be determined according to the actual design. For example, FIG. 17A and FIG. 17B are schematic diagrams of a circuit block of the photosensitive circuit PC161, the storage element SE161, and the storage element SE162 shown in FIG. 16A or FIG. 16B according to different embodiments of the disclosure. The other photosensitive pixels P(1,2) to P(m,n) may be deduced by referring to the related description of the photosensitive pixel P(1,1) shown in FIG. 17A, so the details are not repeated. In the embodiment shown in FIG. 17A, the storage element SE161 includes a sampling capacitor shown in FIG. 17A, the storage element SE162 includes another sampling capacitor shown in FIG. 17A, and the photosensitive circuit PC161 shown in FIG. 17A includes a photosensitive element LE161, a transmission switch SW161, a transmission switch SW162, a reset switch SW165, a transistor M161, and a read switch SW167. According to the actual design, the photosensitive element LE161 may be a photosensitive diode, a photosensitive transistor, or other photosensitive elements.

A first terminal of the transmission switch SW161 is coupled to a first terminal of the photosensitive element LE161. A second terminal of the photosensitive element LE161 is coupled to the reference voltage (for example, the ground voltage or other fixed voltages). A control terminal of the transmission switch SW161 is controlled by a transmission signal TX1. A first terminal of the storage element SE161 is coupled to a second terminal of the transmission switch SW161. A second terminal of the storage element SE161 is coupled to the reference voltage (for example, the ground voltage or other fixed voltages). A first terminal of the transmission switch SW162 is coupled to the second terminal of the transmission switch SW161. A control terminal of the transmission switch SW162 is controlled by a transmission signal TS1. A first terminal of the reset switch SW165 is coupled to the first voltage (for example, the supply voltage VDD). A second terminal of the reset switch SW165 is coupled to a second terminal of the transmission switch SW162. A control terminal of the reset switch SW165 is controlled by a reset signal RST1. A first terminal of the storage element SE162 is coupled to the second terminal of the transmission switch SW162. The second terminal of the storage element SE162 is coupled to the reference voltage (for example, the ground voltage or other fixed voltages).

A control terminal (for example, a gate) of the transistor M161 is coupled to the second terminal of the transmission switch SW162. A first terminal (for example, a drain) of the transistor M161 is coupled to the second voltage (for example, the supply voltage VDD). A control terminal of the read switch SW167 is controlled by the read signal SEL. A first terminal of the read switch SW167 is coupled to a second terminal (for example, a source) of the transistor M161. A second terminal of the read switch SW167 is used as an output terminal of the photosensitive circuit PC161 to output the sensing result $V_{pix}$ of the photosensitive pixel P(1,1) to the displacement processing element 1620.

The other photosensitive pixels P(1,2) to P(m,n) may be deduced by referring to the related description of the photosensitive pixel P(1,1) shown in FIG. 17B, so the details are not repeated. In the embodiment shown in FIG. 17B, the storage element SE161 includes a sampling capacitor shown in FIG. 17B, the storage element SE162 includes another sampling capacitor shown in FIG. 17B, and the photosensitive circuit PC161 shown in FIG. 17B includes a photosensitive element LE161, a transmission switch SW161, a transmission switch SW162, a transmission switch SW163, a transmission switch SW164, a reset switch SW165, a reset switch SW166, a transistor M161, and a read switch SW167. According to the actual design, the photosensitive element LE161 may be a photosensitive diode, a photosensitive transistor, or other photosensitive elements.

A first terminal of the transmission switch SW161 is coupled to a first terminal of the photosensitive element LE161. A second terminal of the photosensitive element LE161 is coupled to the reference voltage (for example, the ground voltage or other fixed voltages). A control terminal of the transmission switch SW161 is controlled by a transmission signal TX1. A first terminal of the storage element SE161 is coupled to a second terminal of the transmission switch SW161. A second terminal of the storage element SE161 is coupled to the reference voltage (for example, the ground voltage or other fixed voltages). A first terminal of the transmission switch SW162 is coupled to the second terminal of the transmission switch SW161. A control terminal of the transmission switch SW162 is controlled by a transmission signal TS1. A first terminal of the reset switch SW165 is coupled to the first voltage (for example, the supply voltage VDD). A second terminal of the reset switch SW165 is coupled to a second terminal of the transmission switch SW162. A control terminal of the reset switch SW165 is controlled by a reset signal RST1.

A first terminal of the transmission switch SW163 is coupled to the first terminal of the photosensitive element LE161. A control terminal of the transmission switch SW163 is controlled by a transmission signal TX2. A first terminal of the storage element SE162 is coupled to a second terminal of the transmission switch SW163. The second terminal of the storage element SE162 is coupled to the reference voltage (for example, the ground voltage or other fixed voltages). A first terminal of the transmission switch SW164 is coupled to the second terminal of the transmission switch SW163. A control terminal of the transmission switch SW164 is controlled by a transmission signal TS2. A first terminal of the reset switch SW166 is coupled to the second terminal of the reset switch SW165. A second terminal of the reset switch SW166 is coupled to a second terminal of the transmission switch SW164. A control terminal of the reset switch SW166 is controlled by a reset signal RST2.

A control terminal (for example, a gate) of the transistor M161 is coupled to the second terminal of the transmission switch SW162. A first terminal (for example, a drain) of the transistor M161 is coupled to the second voltage (for example, the supply voltage VDD). A control terminal of the read switch SW167 is controlled by the read signal SEL. A first terminal of the read switch SW167 is coupled to a second terminal (for example, a source) of the transistor M161. A second terminal of the read switch SW167 is used as an output terminal of the photosensitive circuit PC161 to output the sensing result $V_{pix}$ of the photosensitive pixel P(1,1) to the displacement processing element 1620.

Figure 18:
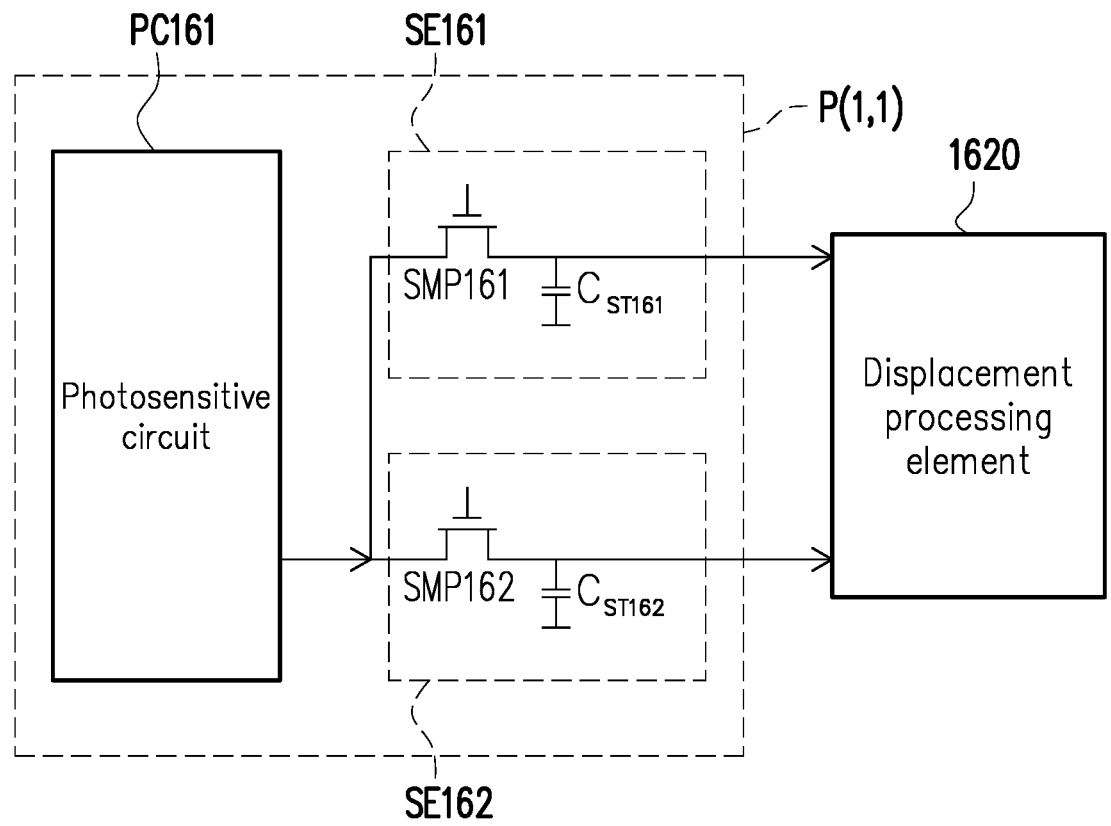
FIG. 18 is a schematic diagram of a circuit block of the storage element shown in FIG. 16B according to another embodiment of the disclosure.

FIG. 18 is a schematic diagram of a circuit block of the storage element SE161 and the storage element SE162 shown in FIG. 16B according to another embodiment of the disclosure. The photosensitive circuit PC161 shown in FIG. 18 may be deduced by referring to the related description of the photosensitive circuit PC91 shown in FIG. 11, so the details are not repeated. The storage element SE161 shown in FIG. 18 includes a sampling switch SMP161 and a sampling capacitor $C_{ST161}$. The storage element SE162 shown in FIG. 18 includes a sampling switch SMP162 and a sampling capacitor $C_{ST162}$. A first terminal of the sampling switch SMP161 is coupled to the output terminal of the photosensitive circuit PC161. A second terminal of the sampling switch SMP161 is coupled to the displacement processing element 1620. A first terminal of the sampling capacitor $C_{ST161}$ is coupled to the second terminal of the sampling switch SMP161. A second terminal of the sampling capacitor $C_{ST161}$ is coupled to the reference voltage (for example, the ground voltage or other fixed voltages). The sampling switch SMP161 is turned on at the first time point, so the sampling capacitor $C_{ST161}$ may receive and store the first sensing result of the photosensitive circuit PC161 at the first time point through the sampling switch SMP161. The sampling capacitor $C_{ST161}$ may provide the first sensing result to the displacement processing element 1620.

A first terminal of the sampling switch SMP162 is coupled to an output terminal of the photosensitive circuit PC161. A second terminal of the sampling switch SMP162 is coupled to the displacement processing element 1620. A first terminal of the sampling capacitor $C_{ST162}$ is coupled to the second terminal of the sampling switch SMP162. A second terminal of the sampling capacitor $C_{ST162}$ is coupled to the reference voltage (for example, the ground voltage or other fixed voltages). The sampling switch SMP162 is turned on at the second time point, so the sampling capacitor $C_{ST162}$ may receive and store the second sensing result of the photosensitive circuit PC161 at the second time point through the sampling switch SMP162. The sampling capacitor $C_{ST162}$ may provide the second sensing result to the displacement processing element 1620.

Figure 19:
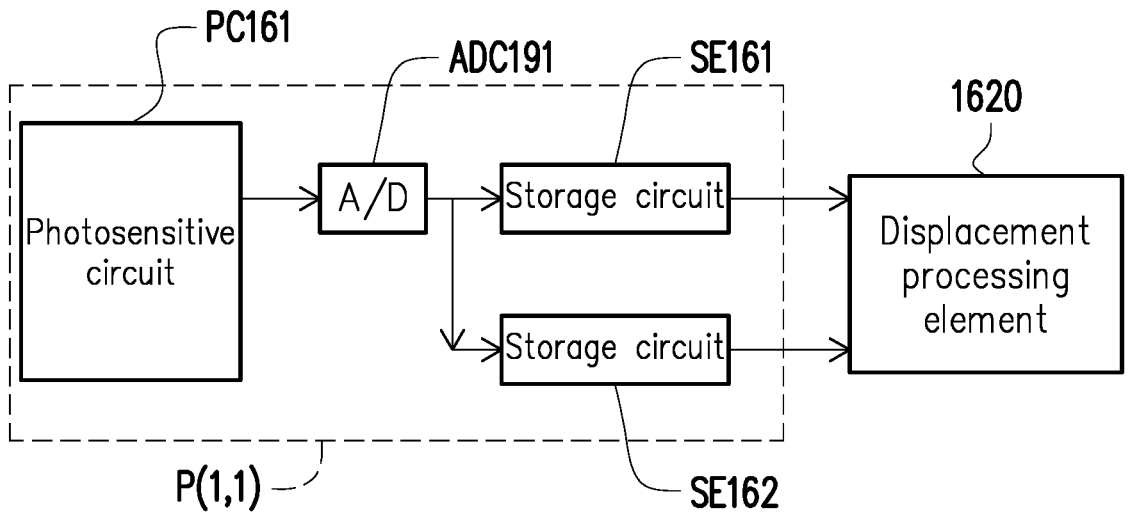
FIG. 19 is a schematic diagram of a circuit block of the storage element shown in FIG. 16B according to still another embodiment of the disclosure.

FIG. 19 is a schematic diagram of a circuit block of the storage element SE161 and the storage element SE162 shown in FIG. 16B according to still another embodiment of the disclosure. In the embodiment shown in FIG. 19, the photosensitive pixel P(1,1) includes the photosensitive circuit PC161, an analog-to-digital converter (A/D) ADC191, the storage element SE161, and the storage element SE162. The photosensitive circuit PC161 shown in FIG. 19 may be deduced by referring to the related description of the photosensitive circuit PC91 shown in FIG. 11, so the details are not repeated. The storage element SE161 shown in FIG. 19 includes a storage circuit, and the storage element SE162 shown in FIG. 19 includes another storage circuit. An input terminal of the analog-to-digital converter ADC191 is coupled to the output terminal of the photosensitive circuit PC161. An input terminal of the storage element SE161 is coupled to an output terminal of the analog-to-digital converter ADC191. An output terminal of the storage element SE161 is coupled to the displacement processing element 1620. An input terminal of the storage element SE162 is coupled to the output terminal of the analog-to-digital converter ADC191. An output terminal of the storage element SE162 is coupled to the displacement processing element 1620.

Figure 20A:
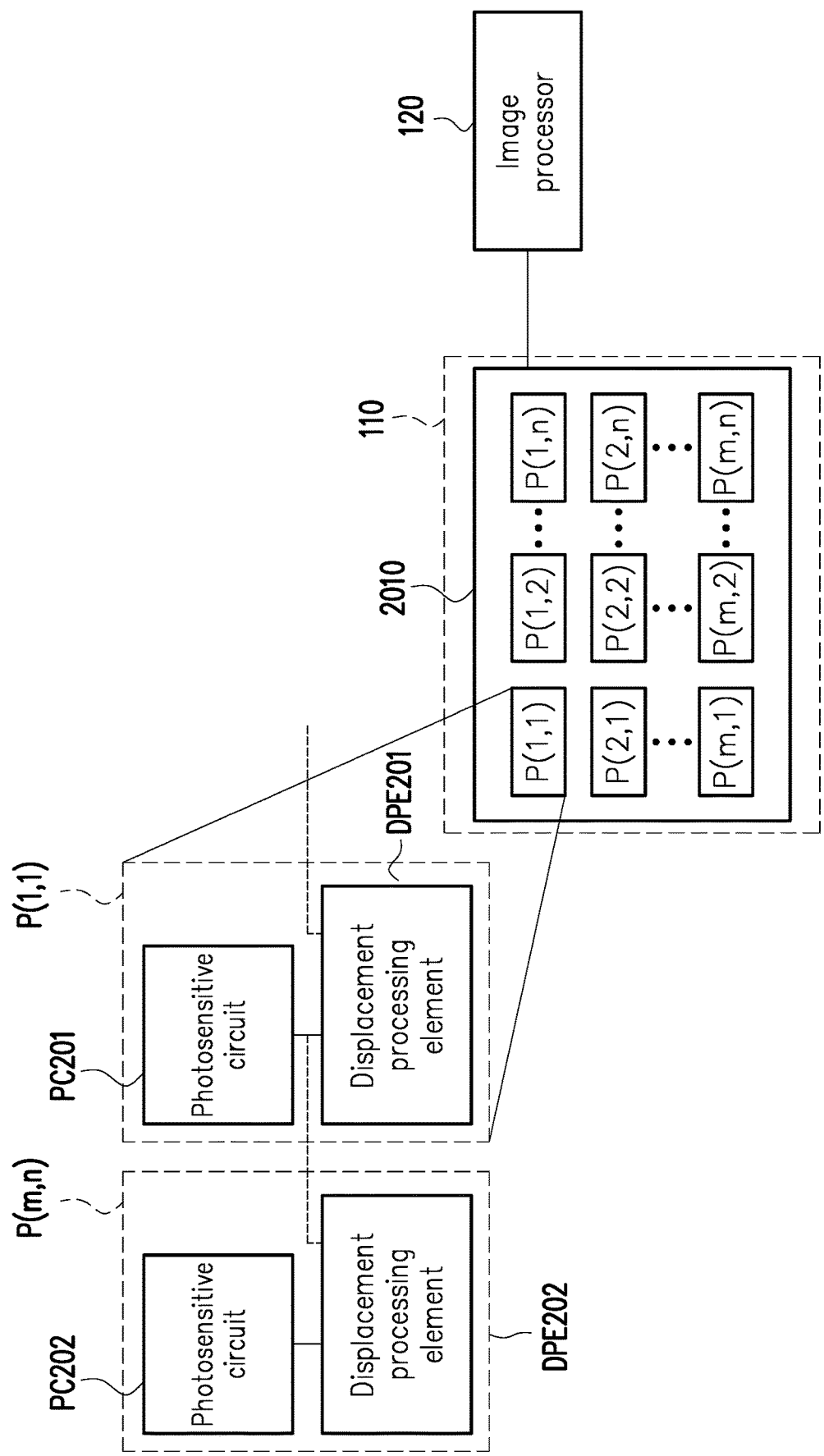
FIG. 20A and FIG. 20B are schematic diagrams of a circuit block of the image sensor of FIG. 1 according to different embodiments of the disclosure.
Figure 20B:
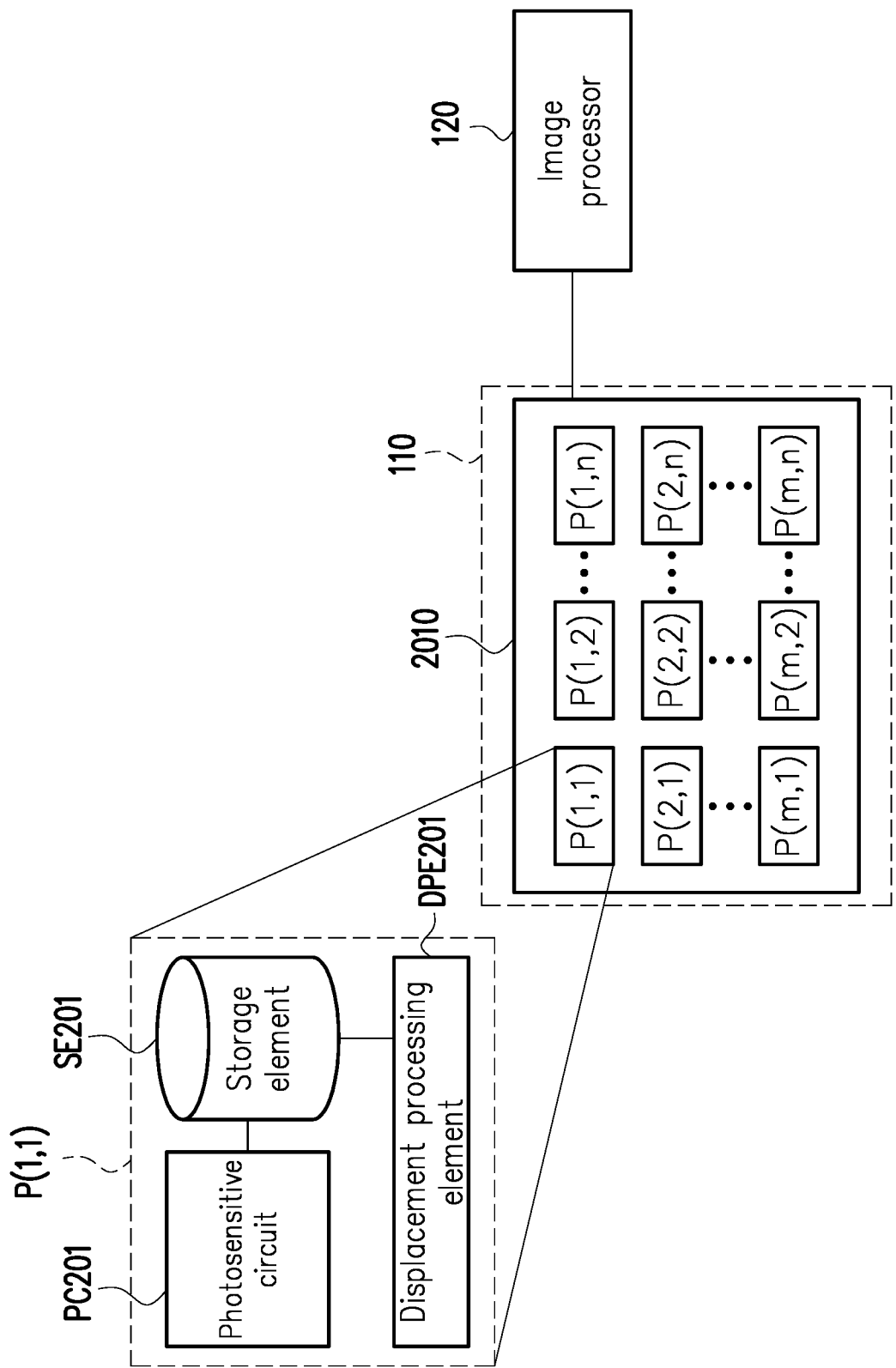

FIG. 20A and FIG. 20B are schematic diagrams of a circuit block of the image sensor 110 of FIG. 1 according to different embodiments of the disclosure. The image sensor 110 shown in FIG. 20A includes a photosensitive pixel array 2010. The photosensitive pixel array 2010 shown in FIG. 20A may be deduced by referring to the related description of the photosensitive pixel array 210 shown in FIG. 2A or FIG. 2B, so the details are not repeated. In the embodiment shown in FIG. 20A, the displacement processing element 220 may be integrated in each photosensitive pixel. For example, a storage element SE201 and a displacement processing element DPE201 may be integrated in the photosensitive pixel P(1,1), and a storage element SE202 and a displacement processing element DPE202 may be integrated in the photosensitive pixel P(m,n). The other photosensitive pixels may be deduced by referring to the related description of the photosensitive pixels P(1,1) and P(m,n), so the details are not repeated. According to the actual design, in some embodiments, the displacement processing elements DPE201 and DPE202 shown in FIG. 20A may be deduced by referring to the related description of a displacement processing element DPE231 shown in FIG. 23 or FIG. 27, so the details are not repeated.

In the embodiment shown in FIG. 20A, the photosensitive pixel P(1,1) includes a photosensitive circuit PC201 and the displacement processing element DPE201. The photosensitive circuit PC201 is coupled to the displacement processing element DPE201. The displacement processing element DPE201 may receive the first sensing result of the photosensitive circuit PC201 of the photosensitive pixel P(1,1) at the first time point, and receive the second sensing result of the photosensitive circuit PC201 of the photosensitive pixel P(1,1) at the second time point. Alternatively, the displacement processing element DPE201 may receive the first sensing result of the photosensitive circuit PC201 of the photosensitive pixel P(1,1) and receive the second sensing result from another photosensitive circuit, e.g. the photosensitive circuit of photosensitive pixel P(1,2). The displacement processing element DPE201 may use the first sensing result and the second sensing result to generate the displacement information.

The image sensor 110 shown in FIG. 20B includes a photosensitive pixel array 2010. The photosensitive pixel array 2010 shown in FIG. 20B may be deduced by referring to the related description of the photosensitive pixel array 210 shown in FIG. 2A or FIG. 2B, so the details are not repeated. In the embodiment shown in FIG. 20B, the storage element 230 and the displacement processing element 220 may be integrated in each photosensitive pixel. For example, a storage element SE201 and a displacement processing element DPE201 may be integrated in the photosensitive pixel P(1,1). The other photosensitive pixels P(1,2) to P(m, n) may be deduced by referring to the related description of the photosensitive pixel P(1,1), so the details are not repeated. According to the actual design, in some embodiments, the displacement processing element DPE201 shown in FIG. 20B may be deduced by referring to the related description of a displacement processing element DPE231 shown in FIG. 23 or FIG. 27, so the details are not repeated.

In the embodiment shown in FIG. 20B, the photosensitive pixel P(1,1) includes a photosensitive circuit PC201, the storage element SE201, and the displacement processing element DPE201. The storage element SE201 is coupled to the photosensitive circuit PC201 and the displacement processing element DPE201. The storage element SE201 may store the first sensing result of the photosensitive circuit PC201 of the photosensitive pixel P(1,1) at the first time point. The displacement processing element DPE201 may use the second sensing result of the photosensitive circuit PC201 at the second time point and the first sensing result provided by the storage element SE201 to generate the displacement information.

Figure 21A:
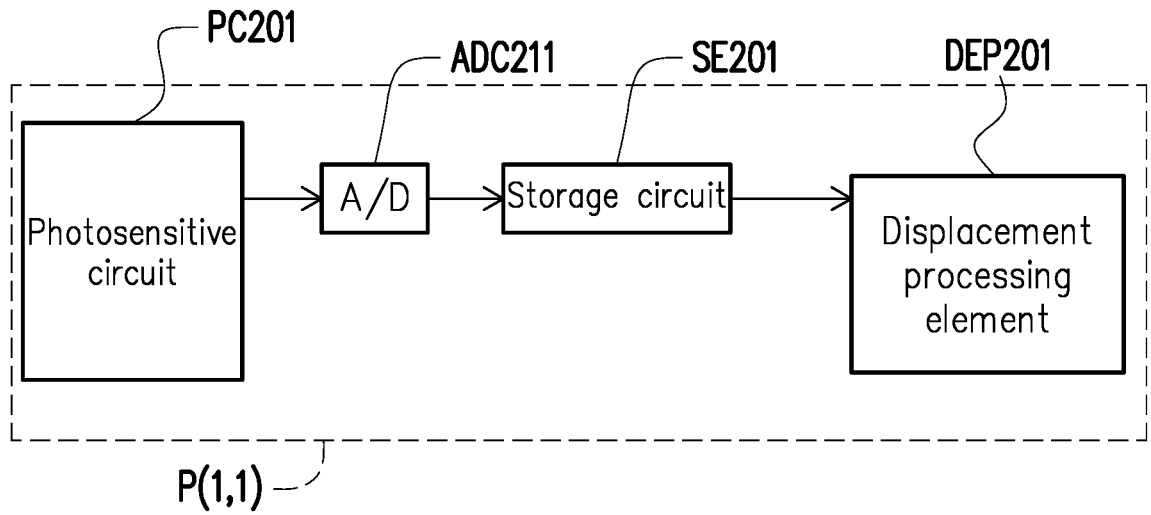
FIG. 21A and FIG. 21B are schematic diagrams of a circuit block of a photosensitive pixel shown in FIG. 20B according to different embodiments of the disclosure.
Figure 21B:
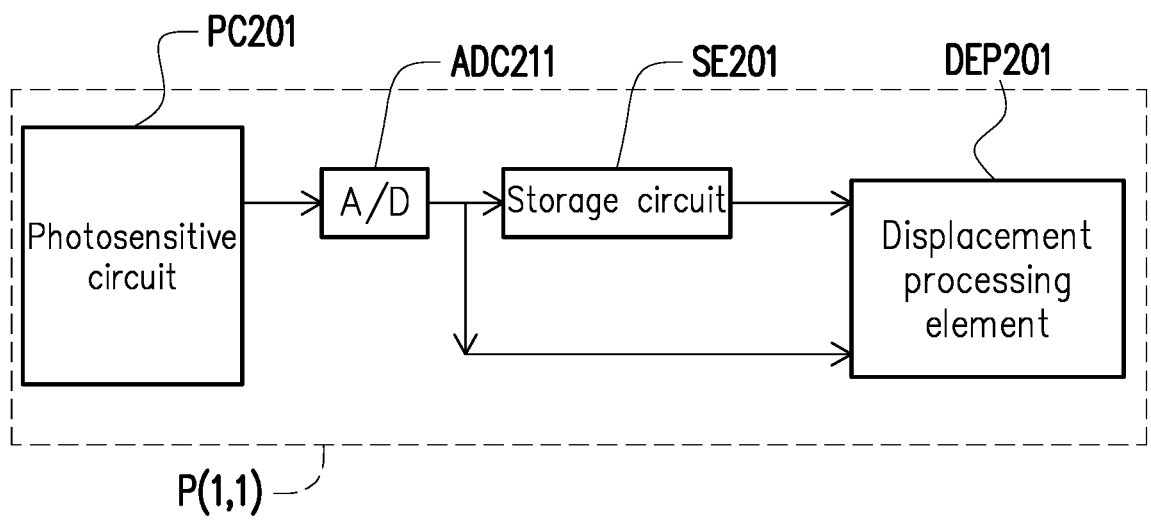

FIG. 21A and FIG. 21B are schematic diagrams of a circuit block of the photosensitive pixel P(1,1) shown in FIG. 20B according to different embodiments of the disclosure. In the embodiment shown in FIG. 21A, the photosensitive pixel P(1,1) includes the photosensitive circuit PC201, an analog-to-digital converter (A/D) ADC211, the storage element SE201, and the displacement processing element DPE201. The photosensitive circuit PC201 shown in FIG. 21A may be deduced by referring to the related description of the photosensitive circuit PC91 shown in FIG. 11, so the details are not repeated. The storage element SE201 shown in FIG. 21A includes a storage circuit. An input terminal of the analog-to-digital converter ADC211 is coupled to an output terminal of the photosensitive circuit PC201. An input terminal of the storage element SE201 is coupled to the output terminal of an analog-to-digital converter ADC211. An output terminal of the storage element SE201 is coupled to the displacement processing element DPE201. The displacement processing element DPE201 may use the sensing result from the storage circuit SE201 to generate the displacement information.

In the embodiment shown in FIG. 21B, the photosensitive pixel P(1,1) includes the photosensitive circuit PC201, an analog-to-digital converter (A/D) ADC211, the storage element SE201, and the displacement processing element DPE201. The photosensitive pixel P(1,1), the photosensitive circuit PC201, the analog-to-digital converter ADC211, the storage element SE201, and the displacement processing element DPE201 shown in FIG. 21B may be deduced by referring to the related descriptions of the photosensitive pixel P(1,1), the photosensitive circuit PC201, the analog-to-digital converter ADC211, the storage element SE201, and the displacement processing element DPE201 shown in FIG. 21A, so the details are not repeated. In the embodiment shown in FIG. 21B, the output terminal of the analog-to-digital converter ADC211 is coupled to the displacement processing element DPE201. The analog-to-digital converter ADC211 also converts the second sensing result of the photosensitive circuit PC201 at the second time point into the second sensing data. The analog-to-digital converter ADC211 may provide the second sensing data to the displacement processing element DPE201 at the second time point. The displacement processing element DPE201 may use the first sensing data provided by the storage circuit SE201 and the second sensing data provided by the analog-to-digital converter ADC211 to generate the displacement information.

Figure 22A:
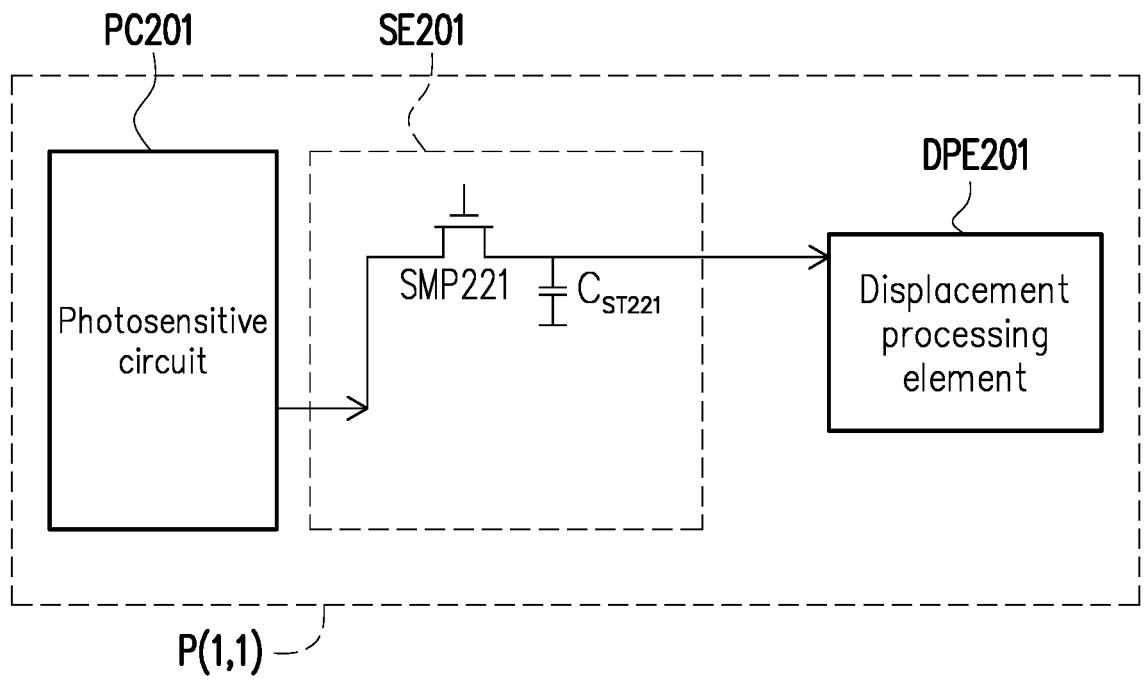
FIG. 22A and FIG. 22B are schematic diagrams of a circuit block of the photosensitive pixel shown in FIG. 20B according to different embodiments of the disclosure.
Figure 22B:
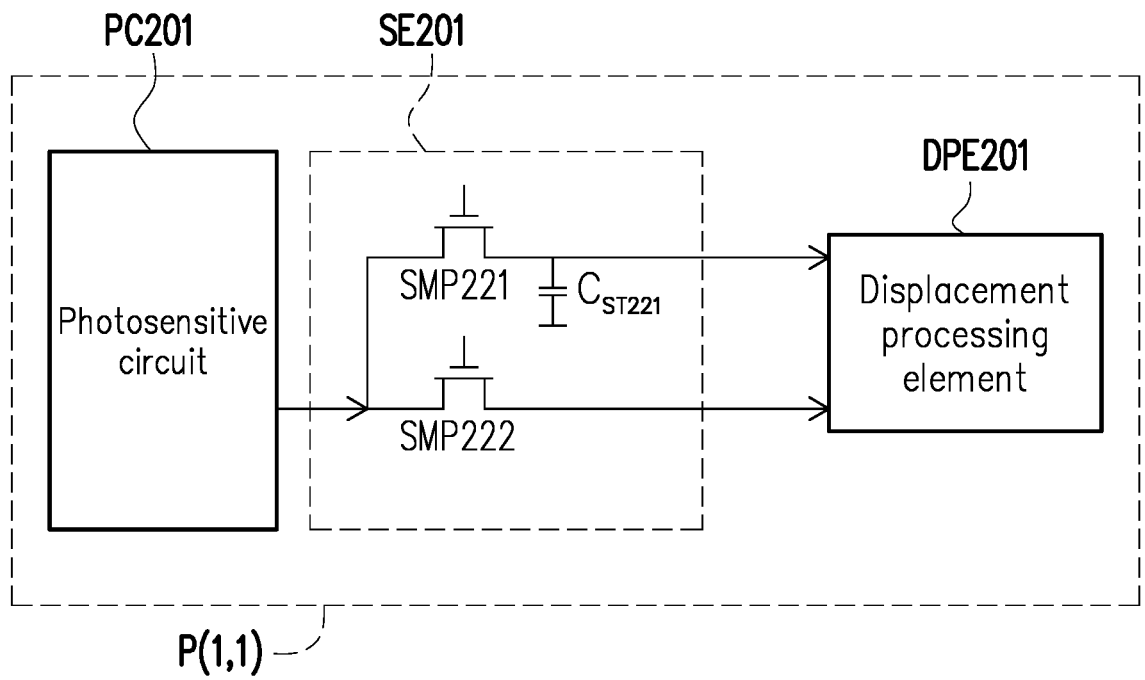

FIG. 22A and FIG. 22B are schematic diagrams of a circuit block of the photosensitive pixel P(1,1) shown in FIG. 20B according to different embodiments of the disclosure. The photosensitive circuit PC201 shown in FIG. 22A may be deduced by referring to the related description of the photosensitive circuit PC91 shown in FIG. 11, so the details are not repeated. The storage element SE201 shown in FIG. 22A includes a sampling switch SMP221, and a sampling capacitor $C_{ST221}$. A first terminal of the sampling switch SMP221 is coupled to the output terminal of the photosensitive circuit PC201. A second terminal of the sampling switch SMP221 is coupled to the displacement processing element DPE201. A first terminal of the sampling capacitor $C_{ST221}$ is coupled to a second terminal of the sampling switch SMP221. A second terminal of the sampling capacitor $C_{ST221}$ is coupled to the reference voltage (for example, the ground voltage or other fixed voltages). The sampling switch SMP221 is turned on at the first time point, so the sampling capacitor $C_{ST221}$ may receive and store the first sensing result of the photosensitive circuit PC201 at the first time point through the sampling switch SMP221. The sampling capacitor $C_{ST221}$ may provide the first sensing result to the displacement processing element DPE201. The displacement processing element DPE201 may use the sensing result from the sampling capacitor $C_{ST221}$ to generate the displacement information.

In the embodiment shown in FIG. 22B, the storage element SE201 includes a sampling switch SMP221, a sampling switch SMP222, and a sampling capacitor $C_{ST221}$. The photosensitive pixel P(1,1), the photosensitive circuit PC201, the storage element SE201, the sampling switch SMP221, the sampling capacitor $C_{ST221}$, and the displacement processing element DPE201 shown in FIG. 22B may be deduced by referring to the related descriptions of the photosensitive pixel P(1,1), the photosensitive circuit PC201, the sampling switch SMP221, the sampling capacitor $C_{ST221}$, and the displacement processing element DPE201 shown in FIG. 22A, so the details are not repeated. In the embodiment shown in FIG. 22B, a first terminal of the sampling switch SMP222 is coupled to an output terminal of the photosensitive circuit PC201. A second terminal of the sampling switch SMP222 is coupled to the displacement processing element DPE201. The sampling switch SMP222 is turned on at the second time point, so the second sensing result of the photosensitive circuit PC201 at the second time point may be transmitted to the displacement processing element DPE201 through the sampling switch SMP222. The displacement processing element DPE201 may use the first sensing data provided by the sampling capacitor $C_{ST221}$ and the second sensing data provided by the sampling switch SMP222 to generate the displacement information.

Figure 23:
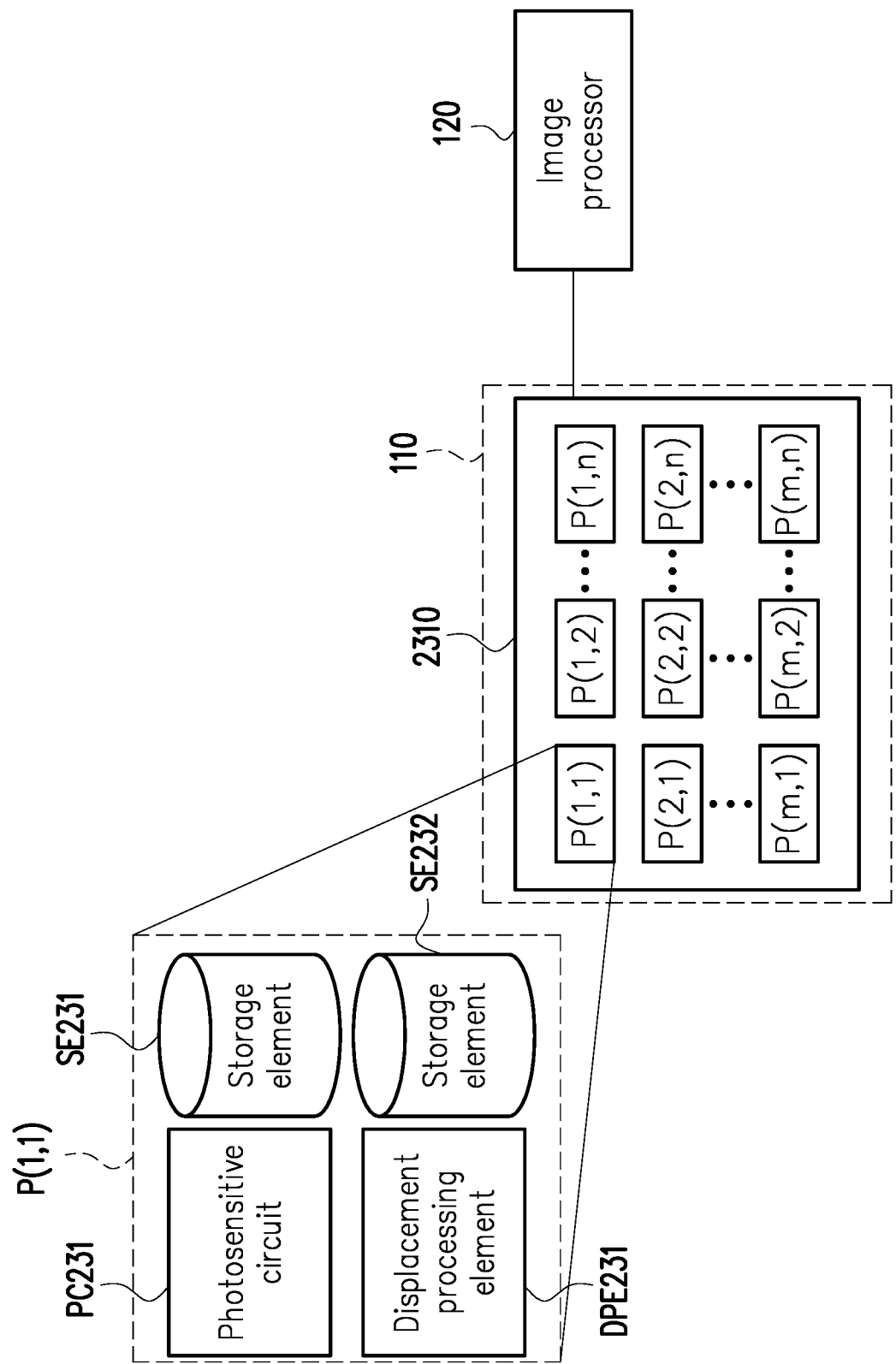
FIG. 23 is a schematic diagram of a circuit block of the image sensor of FIG. 1 according to still another embodiment of the disclosure.

FIG. 23 is a schematic diagram of a circuit block of the image sensor 110 of FIG. 1 according to still another embodiment of the disclosure. The image sensor 110 shown in FIG. 23 includes a photosensitive pixel array 2310. The photosensitive pixel array 2310 shown in FIG. 23 may be deduced by referring to the related description of the photosensitive pixel array 210 shown in FIG. 2A or FIG. 2B, so the details are not repeated. In the embodiment shown in FIG. 23, the storage element 230 and the displacement processing element 220 may be integrated in each photosensitive pixel. For example, a storage element SE231, a storage element SE232, and the displacement processing element DPE231 may be integrated in the photosensitive pixel P(1,1). The other photosensitive pixels P(1,2) to P(m, n) may be deduced by referring to the related description of the photosensitive pixel P(1,1), so the details are not repeated.

In the embodiment shown in FIG. 23, the photosensitive pixel P(1,1) includes a photosensitive circuit PC231, the storage element SE231, the storage element SE232, and the displacement processing element DPE231. The storage elements SE231 and SE232 are coupled to the photosensitive circuit PC231 and the displacement processing element DPE231. The storage element SE231 may store the first sensing result of the photosensitive circuit PC231 of the photosensitive pixel P(1,1) at the first time point. The storage element SE232 may store the second sensing result of the photosensitive circuit PC231 of the photosensitive pixel P(1,1) at the second time point. The displacement processing element DPE231 may use the first sensing result provided by the storage element SE231 and the second sensing result provided by the storage element SE232 to generate the displacement information.

Figure 24A:
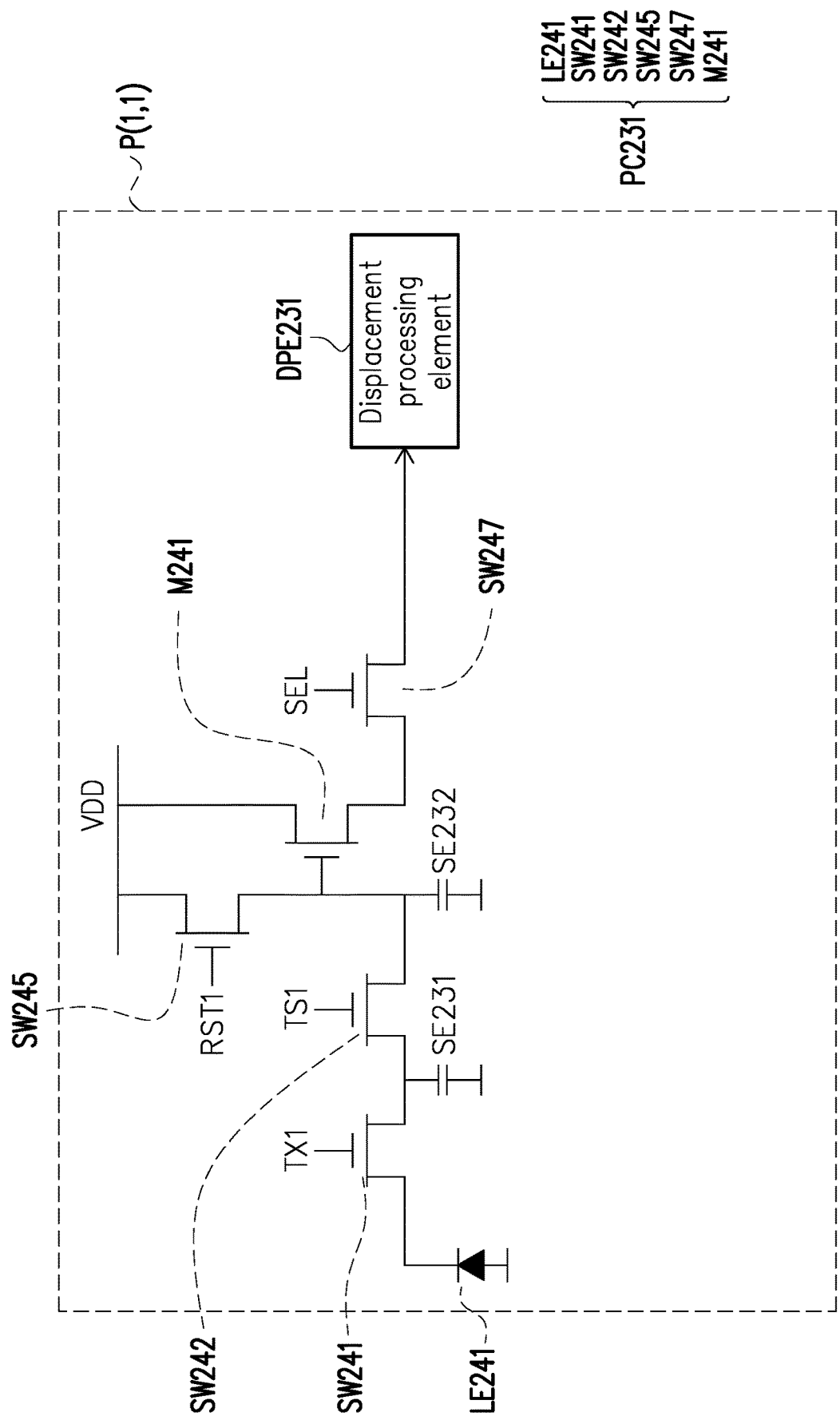
FIG. 24A and FIG. 24B are schematic diagrams of a circuit block of a photosensitive pixel shown in FIG. 23 according to different embodiments of the disclosure.
Figure 24B:
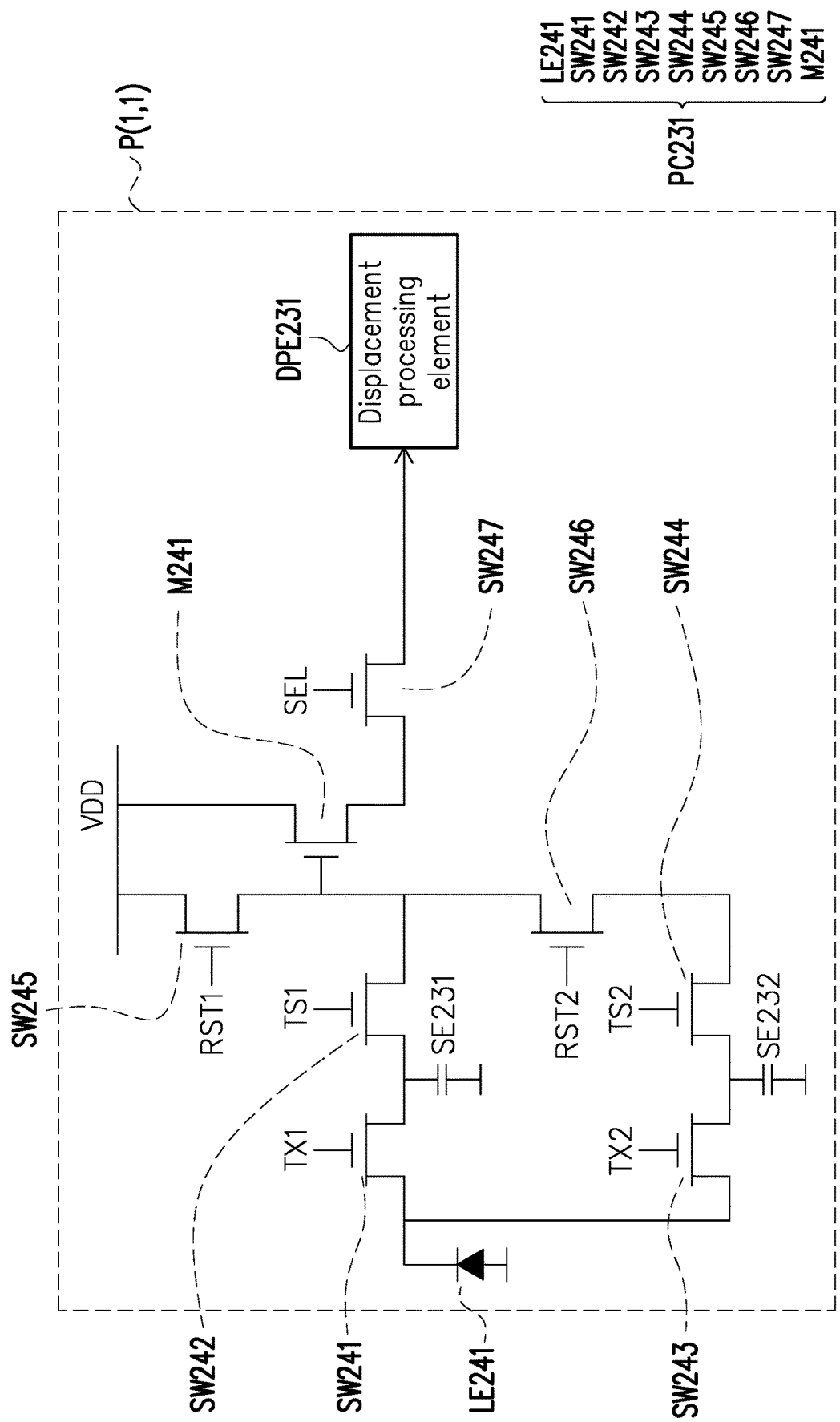

FIG. 24A and FIG. 24B are schematic diagrams of a circuit block of the photosensitive pixel P(1,1) shown in FIG. 23 according to different embodiments of the disclosure. The other photosensitive pixels P(1,2) to P(m,n) may be deduced by referring to the related description of the photosensitive pixel P(1,1) shown in FIG. 24A or FIG. 24B, so the details are not repeated. In the embodiment shown in FIG. 24A, the storage element SE231 includes a sampling capacitor shown in FIG. 24A, the storage element SE232 includes another sampling capacitor shown in FIG. 24A, and the photosensitive circuit PC231 shown in FIG. 24A includes a photosensitive element LE241, a transmission switch SW241, a transmission switch SW242, a reset switch SW245, a transistor M241, and a read switch SW247. The storage element SE231, the storage element SE232, the photosensitive element LE241, the transmission switch SW241, the transmission switch SW242, the reset switch SW245, the transistor M241, and the read switch SW247 shown in FIG. 24A may be deduced by referring to the related descriptions of the storage element SE161, the storage element SE162, the photosensitive element LE161, the transmission switch SW161, the transmission switch SW162, the reset switch SW165, the transistor M161, and the read switch SW167 shown in FIG. 17A, so the details are not repeated.

In the embodiment shown in FIG. 24B, the storage element SE231 includes a sampling capacitor shown in FIG. 24B, the storage element SE232 includes another sampling capacitor shown in FIG. 24B, and the photosensitive circuit PC231 shown in FIG. 24B includes a photosensitive element LE241, a transmission switch SW241, a transmission switch SW242, a transmission switch SW243, a transmission switch SW244, a reset switch SW245, a reset switch SW246, a transistor M241, and a read switch SW247. The storage element SE231, the storage element SE232, the photosensitive element LE241, the transmission switch SW241, the transmission switch SW242, the transmission switch SW243, the transmission switch SW244, the reset switch SW245, the reset switch SW246, the transistor M241, and the read switch SW247 shown in FIG. 24B may be deduced by referring to the related descriptions of the storage element SE161, the storage element SE162, the photosensitive element LE161, the transmission switch SW161, the transmission switch SW162, the transmission switch SW163, the transmission switch SW164, the reset switch SW165, the reset switch SW166, the transistor M161, and the read switch SW167 shown in FIG. 17B, so the details are not repeated.

Figure 25:
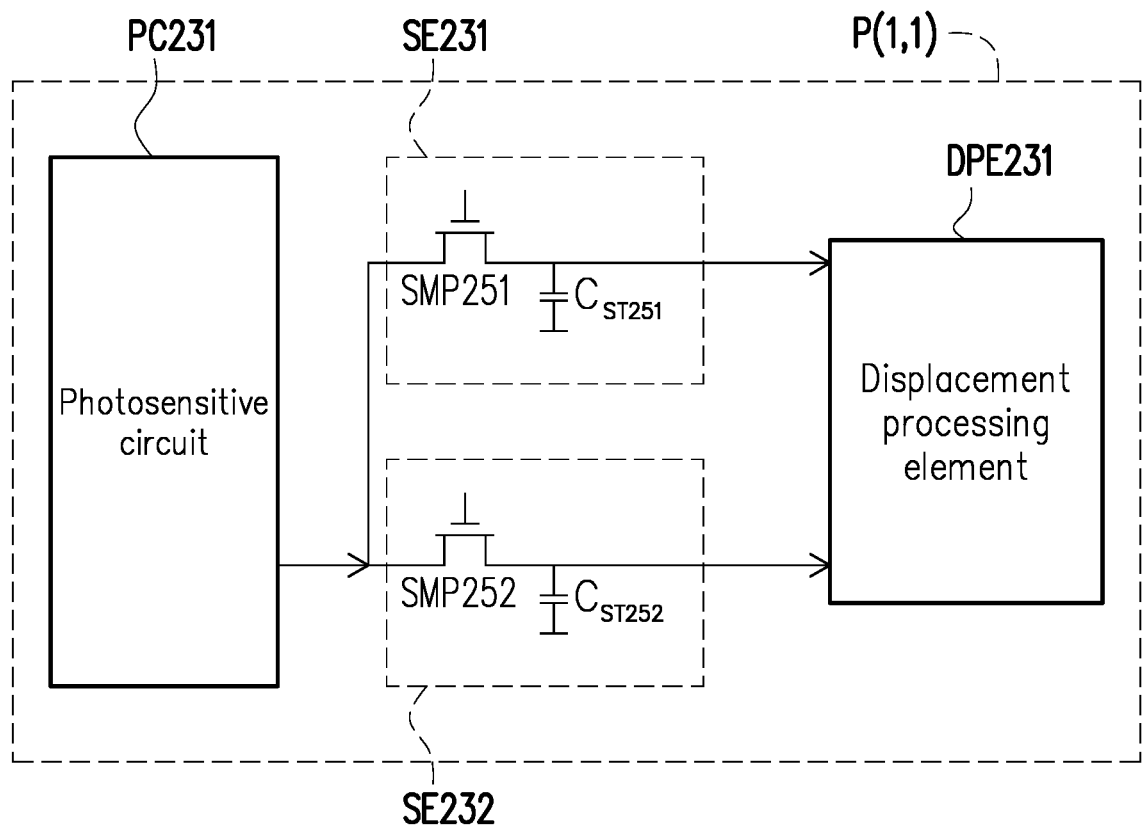
FIG. 25 is a schematic diagram of a circuit block of the photosensitive pixel shown in FIG. 23 according to yet another embodiment of the disclosure.

FIG. 25 is a schematic diagram of a circuit block of the photosensitive pixel P(1,1) shown in FIG. 23 according to yet another embodiment of the disclosure. The other photosensitive pixels P(1,2) to P(m,n) may be deduced by referring to the related description of the photosensitive pixel P(1,1) shown in FIG. 25, so the details are not repeated. In the embodiment shown in FIG. 25, the storage element SE231 includes a sampling switch SMP251 and a sampling capacitor $C_{ST251}$. The storage element SE232 includes a sampling switch SMP252 and a sampling capacitor $C_{ST252}$. The photosensitive circuit PC231, the sampling switch SMP251, the sampling capacitor $C_{ST251}$, the sampling switch SMP252, and the sampling capacitor $C_{ST252}$ shown in FIG. 25 may be deduced by referring to the related descriptions of the photosensitive circuit PC161, the sampling switch SMP161, the sampling capacitor $C_{ST161}$, the sampling switch SMP162, and the sampling capacitor $C_{ST162}$ shown in FIG. 18, so the details are not repeated.

Figure 26:
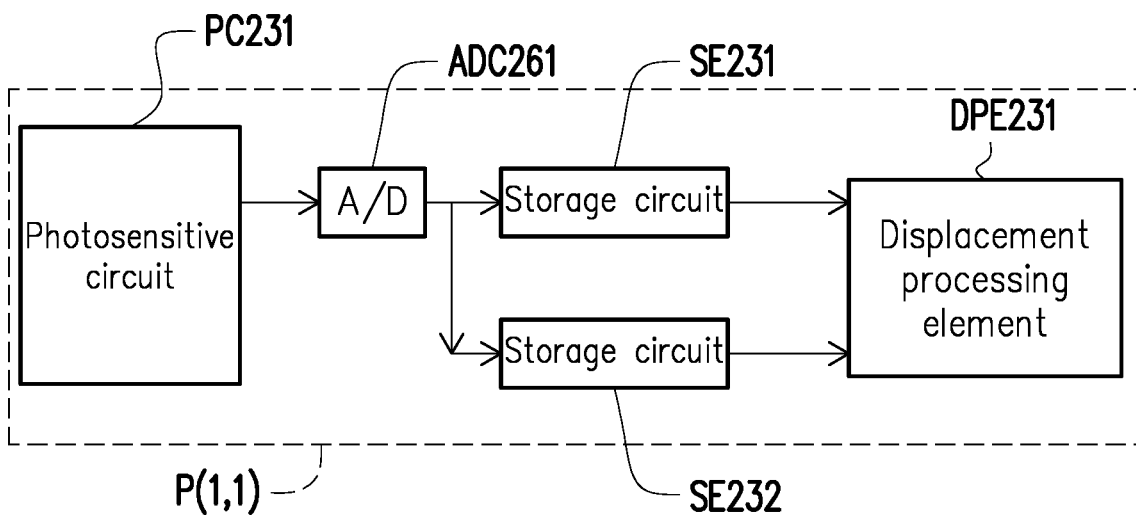
FIG. 26 is a schematic diagram of a circuit block of the photosensitive pixel shown in FIG. 23 according to still another embodiment of the disclosure.

FIG. 26 is a schematic diagram of a circuit block of the photosensitive pixel P(1,1) shown in FIG. 23 according to still another embodiment of the disclosure. The other photosensitive pixels P(1,2) to P(m,n) may be deduced by referring to the related description of the photosensitive pixel P(1,1) shown in FIG. 26, so the details are not repeated. In the embodiment shown in FIG. 26, the storage element SE231 includes a storage circuit, the storage element SE232 includes another storage circuit, and the photosensitive pixel P(1,1) further includes an analog-to-digital converter (A/D) ADC261. The photosensitive circuit PC231, the analog-to-digital converter ADC261, the storage element SE231, and the storage element SE232 shown in FIG. 26 may be deduced by referring to the related descriptions of the photosensitive circuit PC161, the analog-to-digital converter ADC191, the storage element SE161, and the storage element SE162 shown in FIG. 19, so the details are not repeated.

Figure 27:
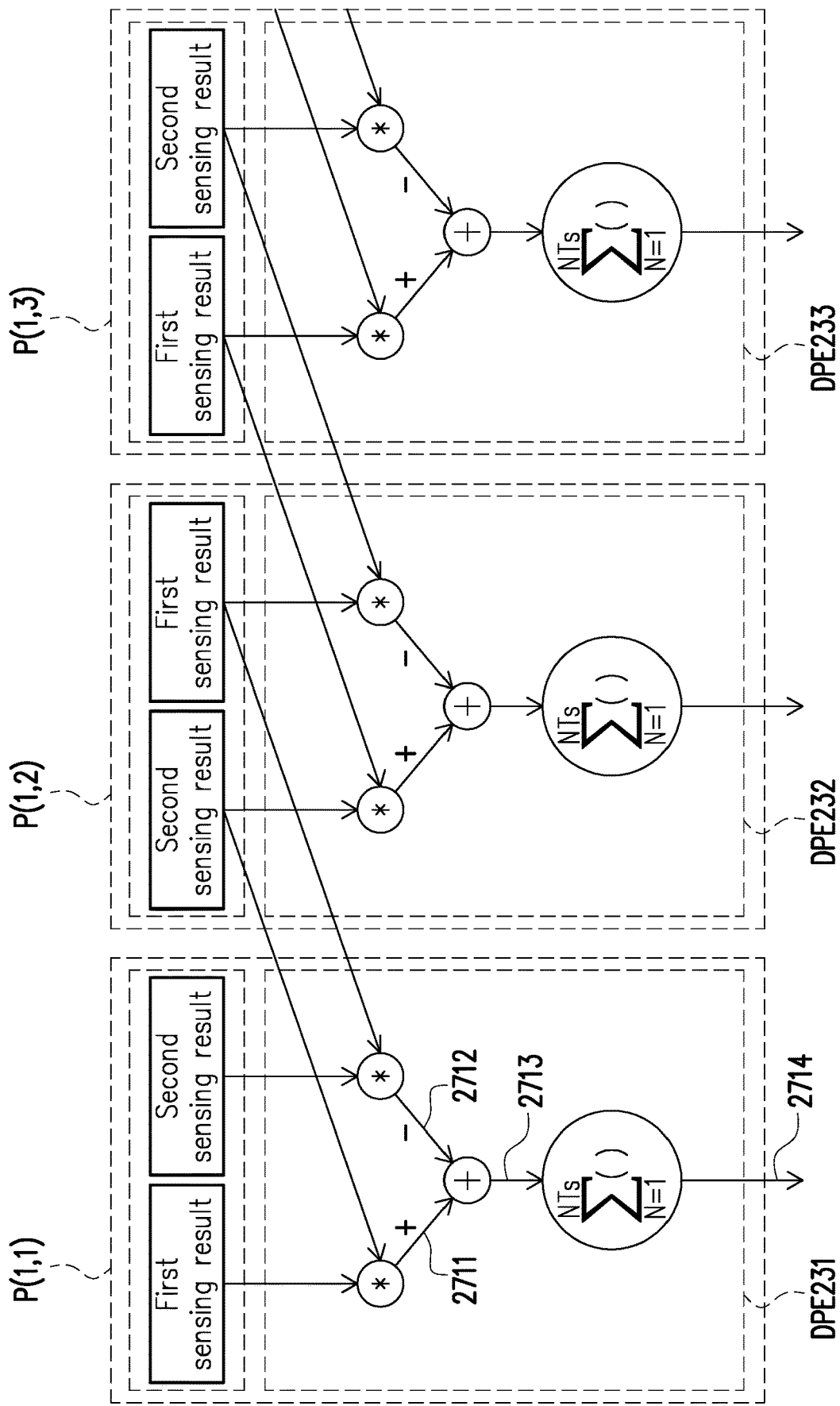
FIG. 27 is a schematic diagram of computations of displacement processing performed by displacement processing elements of multiple photosensitive pixels shown in FIG. 23 according to an embodiment of the disclosure.

FIG. 27 is a schematic diagram of computations of displacement processing performed by displacement processing elements of multiple photosensitive pixels shown in FIG. 23 according to an embodiment of the disclosure. FIG. 27 shows computation examples of the photosensitive pixel P(1,1), the photosensitive pixel P(1,2), and the photosensitive pixel P(1,3). Other photosensitive pixels may be deduced by referring to the related descriptions of the photosensitive pixels P(1,1), P(1,2), and P(1,3) shown in FIG. 27, so the details are not repeated. In the embodiment shown in FIG. 27, the displacement processing elements DPE231, DPE232, and DPE233 are respectively integrated in the photosensitive pixels P(1,1), P(1,2), and P(1,3).

The displacement processing element DPE231 of the photosensitive pixel P(1,1) may use the first sensing result of the photosensitive pixel P(1,1) at the first time point and the second sensing result of the photosensitive pixel P(1,2) at the second time point to perform a multiplication computation to generate a product 2711. The displacement processing element DPE231 may also use the first sensing result of the photosensitive pixel P(1,2) at the first time point and the second sensing result of the photosensitive pixel P(1,1) at the second time point to perform a multiplication computation to generate a product 2712. The displacement processing element DPE231 may subtract the product 2712 from the product 2711 to generate a difference 2713. The displacement processing element DPE231 may accumulate multiple differences 2713 at different time points to generate an accumulated value 2714. The computations of the displacement processing elements of other photosensitive pixels may be deduced by referring to the related description of the displacement processing element DPE231, so the details are not repeated.

In summary, the image sensor 110 described in the above embodiments can sense the illuminance of the scene and motion displacement information (displacement magnitude, direction, speed, and acceleration). The image sensor 110 may output two-dimensional displacement information with illuminance data through a single image frame. The image sensor 110 may obtain the first sensing result (the illuminance data) from the photosensitive pixel array 210 at the first time point and store the first sensing result in the storage element. The image sensor 110 may also obtain the second sensing result (the illuminance data) from the photosensitive pixel array 210 at the second time point. The image sensor 110 includes the displacement processing element. The displacement processing element may calculate the displacement magnitude, direction, speed, and acceleration of motion according to the first sensing result and the second sensing result. In different embodiments, the first sensing result and the second sensing result may be charge, current, voltage, or digital bits after analog-to-digital conversion. The image sensor 110 may output the two-dimensional displacement information and/or a linear or non-linear combination of the first sensing result and the second sensing result through the single image frame.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. An image sensor, comprising:
   a photosensitive pixel array, comprising a photosensitive pixel;
   a first storage element, configured to store a first sensing result of the photosensitive pixel at a first time point; and
   a displacement processing element, coupled to the first storage element to receive the first sensing result, and configured to generate displacement information,
   wherein an image frame with the displacement information is transmitted to an outside of the image sensor,
   wherein the first storage element comprises:
      a first sampling switch, having a first terminal coupled to a sensing output terminal of the photosensitive pixel; and
      a first sampling capacitor, having a first terminal coupled to a second terminal of the first sampling switch and a second terminal coupled to a reference voltage,
   wherein the reference voltage is a voltage other than a ground voltage.

2. The image sensor according to claim 1, wherein the displacement processing element is further configured to receive a second sensing result of the photosensitive pixel at a second time point.

3. The image sensor according to claim 2, wherein the first sampling capacitor receives and stores the first sensing result of the photosensitive pixel through the first sampling switch at the first time point,
   the first sampling capacitor provides the first sensing result to the displacement processing element, and
   the first storage element further comprises:
      a second sampling switch, having a first terminal coupled to the sensing result output terminal of the photosensitive pixel; and
      a second sampling switch, having a first terminal coupled to a second terminal of the second sampling switch,
   wherein a second terminal of the second sampling capacitor is coupled to the reference voltage,
   wherein the second sampling capacitor receives and stores the second sensing result of the photosensitive pixel through the second sampling switch at the second time point, and
   wherein the second sampling capacitor provides the second sensing result to the displacement processing element.

4. The image sensor according to claim 2, wherein the first storage element further comprises:
   an analog-to-digital converter, having an input terminal coupled to a sensing result output terminal of the photosensitive pixel,
      wherein the analog-to-digital converter converts the first sensing result of the photosensitive pixel into first sensing data at the first time point, and
      the analog-to-digital converter converts the second sensing result of the photosensitive pixel into second sensing data at the second time point; and
   a storage circuit, having an input terminal coupled to an output terminal of the analog-to-digital converter,
      wherein the storage circuit stores the first sensing data at the first time point, and
      the storage circuit provides the first sensing data to the displacement processing element,
   wherein the analog-to-digital converter provides the second sensing data to the displacement processing element at the second time point.

5. The image sensor according to claim 1, wherein the first storage element is stacked under the photosensitive pixel array.

6. The image sensor according to claim 1, wherein the displacement information includes at least one of displacement magnitude, direction, speed and acceleration.

7. The image sensor according to claim 1, wherein the photosensitive pixel comprises:
   a photosensitive circuit; and
   the first storage element, coupled to the photosensitive circuit.

8. The image sensor according to claim 7, wherein the displacement processing element is further configured to receive a second sensing result of the photosensitive pixel at a second time point, and
   the first storage element further comprises:
      an analog-to-digital converter, having an input terminal coupled to an output terminal of the photosensitive circuit,
         wherein the analog-to-digital converter converts the first sensing result of the photosensitive circuit into first sensing data at the first time point, and the analog-to-digital converter converts the second sensing result of the photosensitive circuit into second sensing data at the second time point; and a storage circuit, having an input terminal coupled to an output terminal of the analog-to-digital converter,
wherein the storage circuit stores the first sensing data at the first time point, and
the storage circuit provides the first sensing data to the displacement processing element,
wherein the analog-to-digital converter provides the second sensing data to the displacement processing element at the second time point.

9. The image sensor according to claim 7, wherein the displacement processing element is further configured to receive a second sensing result of the photosensitive pixel at a second time point, and
the first storage element further comprises:
a second sampling switch, having a first terminal coupled to the output terminal of the photosensitive circuit,
wherein a second terminal of the second sampling switch is coupled to the displacement processing element, and
the second sampling switch is configured to provide the second sensing element of the photosensitive circuit to the displacement processing element at the second time point,
wherein the first terminal of the first sampling switch is coupled to an output terminal of the photosensitive circuit.

10. The image sensor according to claim 7, further comprising:
a second storage element, coupled to the photosensitive pixel.

11. The image sensor according to claim 10, wherein the second storage element comprises:
a second sampling switch, having a first terminal coupled to an output terminal of the photosensitive pixel, wherein a second terminal of the second sampling switch is coupled to the displacement processing element;
a second sampling capacitor, having a first terminal coupled to the second terminal of the second sampling switch, wherein a second terminal of the second sampling capacitor is coupled to the reference voltage; and
a third sampling switch, having a first terminal coupled to the output terminal of the photosensitive pixel, wherein a second terminal of the third sampling switch is coupled to the displacement processing element.

12. The image sensor according to claim 10, wherein the second storage element comprises:
an analog-to-digital converter, having an input terminal coupled to an output terminal of the photosensitive pixel, wherein an output terminal of the analog-to-digital converter is coupled to the displacement processing element; and
a storage circuit, having an input terminal coupled to the output terminal of the analog-to-digital converter, wherein an output terminal of the storage circuit is coupled to the displacement processing element.

13. The image sensor according to claim 10, wherein the photosensitive circuit comprises:
a photosensitive element;
a transmission switch, having a first terminal coupled to the photosensitive element,
wherein a first terminal of the first storage element is coupled to a second terminal of the transmission switch, and
a second terminal of the first storage element is coupled to the reference voltage;
a reset switch, having a first terminal coupled to a first voltage, wherein a second terminal of the reset switch is coupled to the second terminal of the transmission switch;
a transistor, having a control terminal coupled to the second terminal of the transmission switch, wherein a first terminal of the transistor is coupled to a second voltage; and
a read switch, having a first terminal coupled to a second terminal of the transistor, and
a second terminal of the read switch is used as an output terminal of the photosensitive circuit.

14. The image sensor according to claim 7, wherein the photosensitive pixel further comprises:
a second storage element, coupled to the photosensitive circuit.

15. The image sensor according to claim 14, wherein the photosensitive circuit comprises:
a photosensitive element;
a first transmission switch, having a first terminal coupled to the photosensitive element,
wherein a first terminal of the first storage element is coupled to a second terminal of the first transmission switch,
and a second terminal of the first storage element is coupled to the reference voltage;
a second transmission switch, having a first terminal coupled to the second terminal of the first transmission switch;
a third transmission switch, having a first terminal coupled to the photosensitive element,
wherein a first terminal of the second storage element is coupled to a second terminal of the third transmission switch, and
a second terminal of the second storage element is coupled to the reference voltage;
a fourth transmission switch, having a first terminal coupled to the second terminal of the third transmission switch;
a first reset switch, having a first terminal coupled to a first voltage,
wherein a second terminal of the first reset switch is coupled to a second terminal of the second transmission switch;
a second reset switch, having a first terminal coupled to the second terminal of the first reset switch,
wherein a second terminal of the second reset switch is coupled to a second terminal of the fourth transmission switch;
a transistor, having a control terminal coupled to the second terminal of the second transmission switch,
wherein a first terminal of the transistor is coupled to a second voltage; and
a read switch, having a first terminal coupled to a second terminal of the transistor,
wherein a second terminal of the read switch is used as an output terminal of the photosensitive circuit.

16. The image sensor according to claim 15, wherein the photosensitive pixel further comprises the displacement processing element.

17. The image sensor according to claim 14, wherein the second storage element comprises a second sampling switch and a second sampling capacitor,
the first terminal of the first sampling switch is coupled to an output terminal of the photosensitive circuit, and a second terminal of the first sampling switch is coupled to the displacement processing element;

a first terminal of the second sampling switch is coupled to the output terminal of the photosensitive circuit, and a second terminal of the second sampling switch is coupled to the displacement processing element; and a first terminal of the second sampling capacitor is coupled to the second terminal of the second sampling switch, and a second terminal of the second sampling capacitor is coupled to the reference voltage.

18. The image sensor according to claim 17, wherein the photosensitive pixel further comprises the displacement processing element.

19. The image sensor according to claim 14, wherein the photosensitive pixel further comprises an analog-to-digital converter, an input terminal of the analog-to-digital converter is coupled to an output terminal of the photosensitive circuit;

an input terminal of the first storage element is coupled to an output terminal of the analog-to-digital converter, and an output terminal of the first storage element is coupled to the displacement processing element; and an input terminal of the second storage element is coupled to the output terminal of the analog-to-digital converter, and an output terminal of the second storage element is coupled to the displacement processing element.

20. The image sensor according to claim 19, wherein the photosensitive pixel further comprises the displacement processing element.

21. The image sensor according to claim 7, wherein the photosensitive pixel further comprises an analog-to-digital converter and the displacement processing element, an input terminal of the analog-to-digital converter is coupled to an output terminal of the photosensitive circuit, an output terminal of the analog-to-digital converter is coupled to the displacement processing element, an input terminal of the first storage element is coupled to an output terminal of the analog-to-digital converter, and an output terminal of the first storage element is coupled to the displacement processing element.

22. An image sensor, comprising:

a photosensitive pixel array, comprising at least one photosensitive pixel; and a displacement processing element, configured to receive at least two sensing units from the photosensitive pixel array, and generate displacement information, wherein the displacement information comprises at least one of displacement magnitude, direction, speed, and acceleration;

wherein an image frame with the displacement information is transmitted to and outside of the image sensor, wherein the image sensor comprises:

a first sampling switch, having a first terminal coupled to a sensing result output terminal of the photosensitive pixel; and a first sampling capacitor, having a first terminal coupled to a second terminal of the first sampling switch and a second terminal coupled to a reference voltage, wherein the reference voltage is a voltage other than a ground voltage.

23. The image sensor according to claim 22, wherein the at least one photosensitive pixel comprises:

a first photosensitive pixel; and a second photosensitive pixel, wherein the at least two sensing results are from the first photosensitive pixel and the second photosensitive pixel respectively.

24. The image sensor according to claim 22, wherein the at least two sensing results are from the at least one photosensitive pixel at different time points.

* * * * *